(12) United States Patent
Houlihan et al.

(10) Patent No.: US 11,461,302 B1
(45) Date of Patent: Oct. 4, 2022

(54) STORING MULTIPLE INSTANCES OF DATA ITEMS TO IMPLEMENT KEY OVERLOADING IN DATABASE TABLES

(71) Applicant: Amazon Technologies, Inc., Seattle, WA (US)

(72) Inventors: John Richard Houlihan, Round Rock, TX (US); Padma Malligarjunan, Austin, TX (US); Fahad Ahmed, Santa Clara, CA (US); Geetika Vasudeo, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 270 days.

(21) Appl. No.: 16/103,834

(22) Filed: Aug. 14, 2018

(51) Int. Cl.
*G06F 16/22* (2019.01)
*G06F 16/21* (2019.01)
*G06F 16/23* (2019.01)

(52) U.S. Cl.
CPC ........ *G06F 16/2282* (2019.01); *G06F 16/212* (2019.01); *G06F 16/2379* (2019.01)

(58) Field of Classification Search
CPC . G06F 16/2282; G06F 16/2379; G06F 16/212
USPC ................................................ 707/741, 812
See application file for complete search history.

(56) References Cited

U.S. PATENT DOCUMENTS

| | | |
|---|---|---|
| 5,799,310 A | 8/1998 | Anderson et al. |
| 6,421,658 B1 | 7/2002 | Carey et al. |
| 9,325,802 B2 * | 4/2016 | Krishnaprasad .... G06F 11/1471 |
| 9,432,459 B2 * | 8/2016 | Sivasubramanian ........................ G06F 16/217 |
| 2010/0125579 A1 * | 5/2010 | Pardoe .................... G06F 16/86 707/736 |
| 2010/0145914 A1 * | 6/2010 | Kanno ................ G06F 16/2329 707/638 |
| 2013/0103725 A1 | 4/2013 | Wee et al. |
| 2014/0101206 A1 * | 4/2014 | Rawal .................... G06F 16/256 707/803 |
| 2015/0205885 A1 | 7/2015 | Zhou et al. |
| 2018/0365294 A1 * | 12/2018 | Cho .................... G06F 16/2246 |

* cited by examiner

*Primary Examiner* — Hares Jami
(74) *Attorney, Agent, or Firm* — Robert C. Kowert; Kowert, Hood, Munyon, Rankin & Goetzel, P.C.

(57) ABSTRACT

Systems and methods are provided to implement a key overloaded database table that stores multiple instances of a data item using different key attributes to facilitate different types of queries. In embodiments, different partition or sorting keys are specified in different table facets schemas, for the table or for individual items. In embodiments, when an item is inserted into the table, the insertion operation copies values from appropriate attributes of the item into overloaded partition key and sort key fields of the instances to be inserted. In embodiments, when a primary instance of an item is updated, the secondary instances are found using facet schemas stored with the primary instance and overwritten in asynchronous fashion to reflect the state of the primary instance. Advantageously, the disclosed key overloading technique reduces the need for separate index objects for the table and simplifies query planning for the table.

25 Claims, 17 Drawing Sheets

```
CreateTable (                                              200
    TableName = Orders,
    Attributes = {                                         210
        OrderId : INTEGER,
        CustomerId : STRING,
        OrderDate : DATE,
        RegionId : STRING,
        ZipCode : INTEGER
    },
    PrimarySchema = {                                      220
        PartitionKey = OrderId,
        SortKey = CustomerId
    },
    SecondarySchema = {                                    230
        PartitionKey = CustomerId,
        SortKey = OrderDate
    },
    SecondarySchema = {                                    240
        PartitionKey = RegionId,
        SortKey = OrderDate|ZipCode
    }
)
```

FIG. 2A

```
PutItem (                                              250

TableName = Orders,
    _____
    Values = {                                          260

OrderId = '123',

CustomerId = 'Bob',

OrderDate = '7/7/2018',

RegionId = 'Seattle',

ZipCode = '98125'

},
    _____
    PrimarySchema = {                                   270

PartitionKey = OrderId,

SortKey = CustomerId

},
    _____
    SecondarySchema = {                                 280

PartitionKey = CustomerId,

SortKey = OrderDate,

ProjectedAttribs =
            {RegionId, ZipCode},

OnKeyCollision = FORCE_UNIQUE

},
    _____
    SecondarySchema = {                                 290

FacetName = 'Bob Orders',

PartitionKey = RegionId,

SortKey = OrderDate,

ProjectedAttribs =
        {ZipCode, Order ID}, }

| partition key 610 | sort key 612 | projected attributes 620 |
|---|---|---|
| David | 2018-07-06 | ... |
| Seattle | 2018-01-10 | ... |
| Seattle | 2018-02-14 | ... |
| Boston (Bob) | 2017-05-30 | ... |
| Seattle (Bob) | 2018-07-07 | ... |
| Seattle (Bob) | 2018-07-09 | ... | table 600 query potentially returns items from multiple facets 635 targeted query returns only items from isolated facet 645 items in overlaid facet(s) 630 items in isolated facet (only Bob) 640 incorporate facet token 642

FIG. 6

STORING MULTIPLE INSTANCES OF DATA ITEMS TO IMPLEMENT KEY OVERLOADING IN DATABASE TABLES

BACKGROUND

Database table indexing techniques have evolved over time. In some database implementations, indexes are stored as separate database objects to support different access patterns of the table. In some types of databases, such as NoSQL databases, the table definition specifies a key attribute on data items in order to uniquely identify the item or to determine a storage partition for the item. Some databases tables may also specify a sort key attribute which is combined with the partition key to form a primary key that defines uniqueness of the item. These key attributes may be selected to support an expected access pattern of the table. However, in order to support multiple secondary access patterns for the table, additional database objects such as indexes are used. The maintenance of these separate index objects can be generally expensive, both in term of storage costs and computational overhead during table updates. The proliferation of these indexes also dramatically complicates the query planning process, which must decide, from a large collection of indexes, which indexes to use for each stage of the query. There is a general need for better solutions to support multiple access patterns for a single table.

BRIEF DESCRIPTION OF THE DRAWINGS

FIGS. 2A and 2B illustrate a create table call and an insert call in a data store that implements key overloading in storage objects, according to some embodiments.

FIG. 6 illustrates an isolated facet of item in table that supports key overloading, according to some embodiments.

Figure 1:
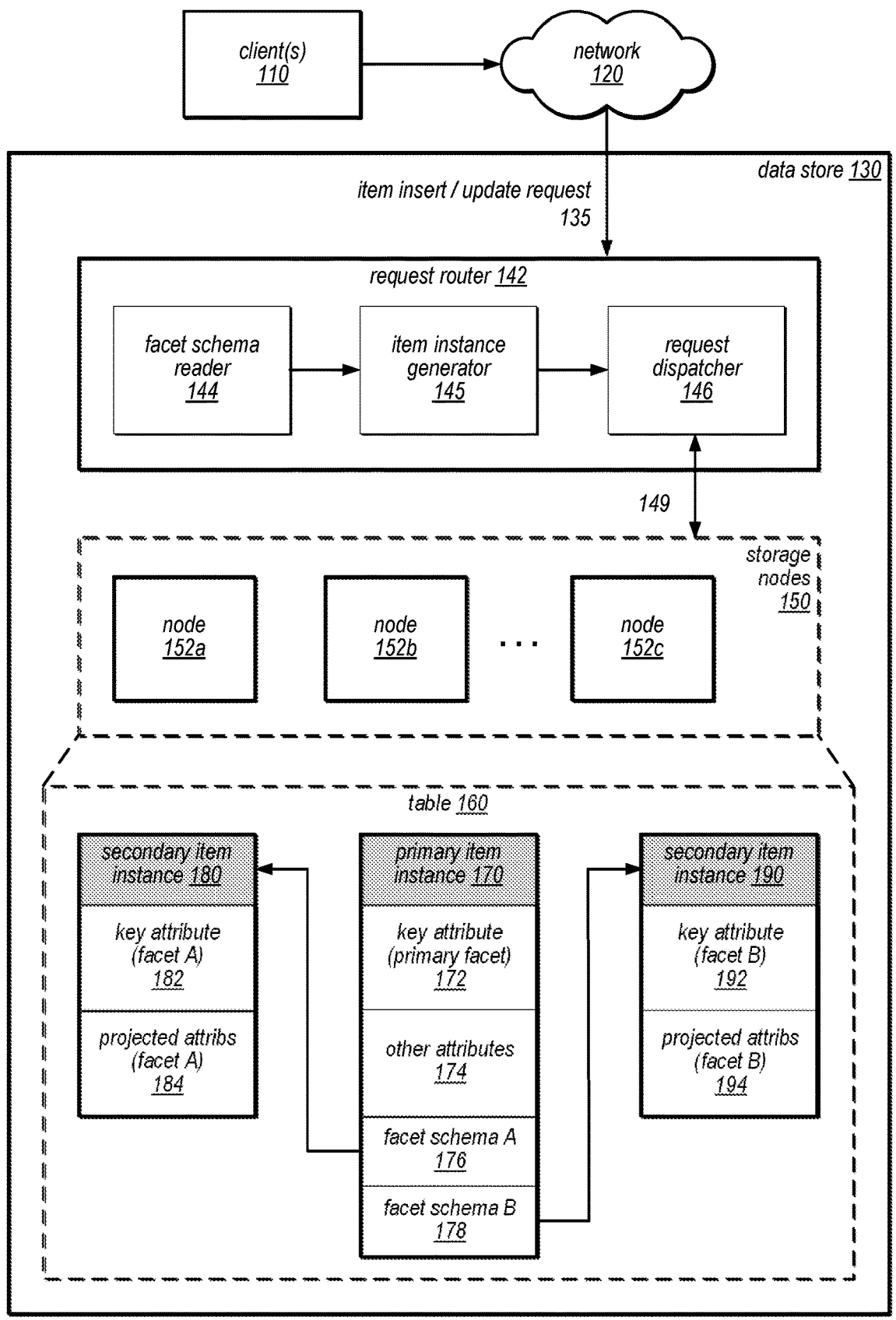
FIG. 1 is a block diagram illustrating an example data store that implements key overloading in storage objects, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a data store that implements key overloading in storage objects. In some embodiments, the data store stores a single data item in multiple times in a key overloaded table. Different copies of the data item may be stored according to different facets of the table to support different access patterns. In some embodiments, different table facets may specify different partition key or sort key attributes for data items, so that the same item is stored in the table in multiple different ways, with different attributes as the item's partition key and sort key. Among other advantages, the disclosed key overloading technique reduces the need for separate index objects for the table and simplifies query planning for the table.

In many database implementations, indexes are stored as separate database objects used to support different access patterns of the table. In some types of databases, such as NoSQL databases, the table definition specifies a key attribute on data items in order to uniquely identify the item or to determine a storage partition for the item. Some databases tables may also specify a sort key attribute which is combined with the partition key to form a primary key that defines uniqueness of the item. These key attributes are selected to support an expected access pattern of the table.

However, in order to support secondary access patterns for the table, additional database objects such as indexes are used.

Indexing in data stores may be performed based on item or row level attributes, and it is a fundamental feature in both NoSQL databases as well as relational database management systems (RDBMS). When items are inserted into a table or a collection a pointer to that item is maintained for each attribute that is being indexed. The system then uses an index to query the table in order to produce a result set. Some data stores leave the decision up to the clients and allow them to directly query and scan tables or indexes they need to depending on the access pattern. Some data stores have implemented sophisticated query planners to parse and optimize query statements and identify the best index or query pattern to retrieve the result set. In all cases, the index data is stored, maintained, and queried separately from the main table or collection. The maintenance of these separate index objects can be generally expensive, both in term of storage costs and computational overhead during table updates. Moreover, the proliferation of these indexes dramatically complicates the query planning process, which must decide, based on a large collection of indexes, how to break a received query into stages and which indexes to use for each stage.

Accordingly, in some embodiments disclosed herein, an alternative approach to indexing and query planning is described to leverage key overloading within a database table or storage object. According to some embodiments, key overloading involves eliminating the tight coupling between a specific attribute within an item and allowing the client to specify an arbitrary list of key conditions to be applied as the item or document is inserted. In embodiments, a primary facet of the table, specifying a particular set of partition key and sort key attributes for the table, is defined when the table is initially created. This primary facet may create a one-to-one relationship between the partition and the sort key values and other named attributes in the item. For example, an Orders table may be partitioned on a CustomerID attribute and sorted on a OrderDate attribute to support an access pattern that required the last 30 days of orders for a customer. If the application or client also required the data store to produce an aggregation of Order items by sales representative over time, a secondary facet on the table may be created so that a second copy of the items may be stored with the SalesRepID attribute as the partition key and the OrderDate as the sort key. This second facet of the table can be used to support queries from the alternate aggregation or access pattern.

As may be understood, the storing of this second facet within the table or storage object eliminates the need for a separate index object on the SalesRepID attribute or a table scan to filter items by SalesRepID. The elimination of the index in this fashion reduces storage costs in the data store and simplifies both the updating and querying of the table. For example, where indexes are avoided, updates to the table may be completed without propagating changes to the index, allowing the update to be performed more quickly and using less computing resources. Queries may be performed based on client-specified partition key and sort key values that are directed to a particular facet in the table, so that query planners are no longer needed to select index objects. The table may be key overloaded to support all types of expected queries, so that the table can be queries without any indexes. For some data storage services that charge clients based on the number of hosted objects or places limits the number of hosted objects, a key overloaded table provides a more flexible and cheaper alternative to indexes.

In some embodiments, the key overloaded table may store, for each item in the table, a primary instance of the item and multiple secondary instances of the item. The primary instance may be generated and stored according to a primary facet schema of the table, which may specify a particular partition key and sort key combination for the primary instance. The secondary instances may be generated and stored according to respective secondary facet schemas, which may specify alternative partition key and sort key combinations. In some embodiments, the secondary facet schemas of the item may be stored with the primary instance of the item. In some embodiments, an update to the item first updates the primary instance. The secondary facet schemas are then obtained from the primary instance and the secondary instances are updated accordingly. In some embodiments, the secondary instances are not overwritten with each update. For example, the secondary instances are always deleted and then recreated, which in some cases a simpler process than an update to the secondary instance.

In some embodiments, the secondary instances are automatically managed by the data store within the table, and the client do not have to issue multiple insert or update requests against the table for a single item. For example, a single insert request for a single item specifying five different facets may cause the data store to automatically create five instances for the time. Subsequent updates to the item will automatically update all five instances. In some embodiments, clients update requests are only permitted on the primary instance of the item, and not the secondary instances. For example, the data store may verify that an item being updated by a client request is a primary item instance before proceeding the update, for example, by checking that the item contains facet schema metadata for the item. In other embodiments, the secondary instances of the item can be directly updated by client requests.

In some embodiments, the automatic update of the secondary instances of an item may be performed asynchronously. For example, the secondary instance updates may be performed lazily, at a time chosen by the data store. In some embodiments, the update request may be acknowledged to the client issuing the request before the secondary instances are updated. This asynchronous updating of the secondary instances reduces the latency of update requests. In some embodiments, the eventual results of secondary instance updates are provided to the client via notifications.

Due to the asynchronous updating of the secondary instances, in some cases, a data store may attempt to perform these updates out of order. For example, although an update A may occur before another update B on a primary instance, the propagated updates for A and B to a secondary instance may arrive in reverse order. To resolve this issue, in some embodiments, a version check is performed before performing the secondary instance update. For example, in some embodiments, when a primary instance is updated, a version number is generated for the update (e.g. based on a timestamp). The secondary instance update is performed only conditionally, based on a condition that the version generated at the time of the primary instance update is newer than a current version of the secondary instance. If the secondary instance has a newer version, this may indicate that it already received an updated propagated as the result of a later update to the primary instance, and in that case, the conditional update will be aborted. In some embodiments, the conditional update may be performed in an atomic fashion, so that the conditional update will only succeed if the condition simultaneously satisfied.

As may be understood, in some embodiments, a query against a key overloaded table may return a result set that contains items from multiple table facets. In some embodiments, this may be a desired result. For example, in the Orders table example, two facets may specify two different types of dates as the sort key, and the querying client may be interested in obtaining item instances with both types of dates. Additionally, in some embodiments, the data store may allow the client to define a named or isolated facet, which can be queried in isolation. For example, in some embodiments, the data store may salt the partition key of items to be stored under the isolated facet with a special token. The special token forces all items under the isolated facet to be assigned to a set of partitions that are segregated from other items in the table. At query time, the client may indicate that the query is to be directed to the isolated facet, for example by naming the facet in the query or providing a query with salted partition key values. As a result, the query will only return instances from the isolated facet.

As one skilled in the art will appreciate in light of this disclosure, the features discussed above improve the functioning of conventional data stores by providing an alternative to separate index objects. These and other features and benefits of the inventive data store system and methods are described in further detail below, in connections with the figures.

FIG. 1 is a block diagram illustrating an example data store that implements key overloading in storage objects, according to some embodiments. As shown, the figure depicts a data store 130, which may be configured to service clients 110 over a network 120.

The data store 130 may encompass any type of data store or database configurable to receive service requests from the clients via network 120. In some embodiments, the data store 130 may not be a network-based storage service, but rather be accessed by a client on the same computer. In some embodiments, a given client may include a suitable version of a web browser or a plug-in module for a web browser, or other type of code module configured to execute as an extension to or within an execution environment to provide database or data storage service clients (e.g., client applications, users, and/or subscribers) access to the services provided by data store 130. In some embodiments, a client may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. In some embodiments, the client may be an application configured to interact directly with the database system 130. In some embodiments, a client may be configured to generate web service requests according to a Representational State Transfer (REST)-style web services architecture, a document- or message-based web services architecture, or another suitable web services architecture.

As illustrated, the data store 130 may receive requests from and send responses to the clients via a network 120. In various embodiments, the network 120 may encompass any suitable combination of networking hardware and protocols necessary to establish network communications between clients and data store 130. For example, network 120 may encompass the various telecommunications networks and service providers that collectively implement the Internet. Network 120 may also include private networks such as local area networks (LANs) or wide area networks (WANs) as well as public or private wireless networks. For example, both a given client and data store 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and data store 130. In some embodiments, clients may communicate with network-based data store 130 using a private network rather than the public Internet. For example, a client may be provisioned within the same enterprise as the data store 130 and/or the underlying system described herein. In some embodiments, a client may comprise a service that is offered by the same service provider that offers the data store 130 as a service.

In some embodiments, the data store or database 130 may be configured to implement one or more service endpoints configured to receive and process service requests, such as requests to access database objects maintained on behalf of clients/users by data store 130, and/or the items and attributes stored in those database objects. For example, data store 130 may include hardware and/or software configured to implement various service endpoints and to properly receive and process HTTP-based web services requests directed to those endpoints. In one embodiment, data store 130 may be implemented as a server system configured to receive web services requests from clients and to forward them to various components that collectively implement a data storage system for processing. In some embodiments, data store 130 may be configured as a distributed system (e.g., in a cluster topology) implementing load balancing and other request management features configured to dynamically manage large-scale web services request processing loads.

Depending on the embodiment, the data store 130 may include different versions of some of the components illustrated in the figure to provide functionality for creating, accessing, and/or managing tables and/or indexes maintained in database instances within a multi-tenant environment. In various embodiments, the components in the data store 130 may be implemented directly within computer hardware, as instructions directly or indirectly executable by computer hardware (e.g., a microprocessor or computer system), or using a combination of these techniques. For example, the components of the data store 130 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In some embodiments, the data store 130 may be a NoSQL database. In various embodiments, data store 130 may be configured to support different types of service requests, such as item insert or update requests 135. For example, in some embodiments, data store 130 may be configured to implement a particular web services application programming interface (API) that supports a variety of operations on tables or other data objects, that are maintained and managed on behalf of clients/users by the data storage service system. The APIs provided by the data store 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, objects in the data store 130, such as table 160, may be divided into partitions. In some embodiments, the database or data store 130 may be partitioned globally, and not just within individual storage objects. In some embodiments, each partition may be independently managed by a group of compute or storage nodes, such as nodes 152a-c, which may maintain replicas of the data in the partitions. A partition replica may be assigned to a particular storage node based largely (or solely) on whether there is enough storage capacity for the anticipated size of the storage object. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a storage device to which the partition replica is assigned may be oversubscribed in terms of input/output operations per second ("IOPS"), the actual number of IOPS may be more than was expected, or the provisioned (or committed) number of IOPS may have grown after the partition replica was created.

In some embodiments, the data store 130 may support seamless scaling of storage objects 160 in a "fully shared nothing" type architecture. For example, in some embodiments, each table partition may be implemented as a completely independent parallel computation unit. In such embodiments, the system may provide minimal distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, dynamic repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

As shown, the data store 130 may be implemented via one or more request routers 142. In some embodiments, the request router 142 may be tasked with receiving data store requests, such as insert or update requests 135, and the forwarding the requests to one or more groups of storage nodes 150. In some embodiments, the data in the table 160 are partitioned into multiple partitions, which are independently managed by different partition group of storage nodes. In some embodiments, each data item in the table is assigned to a partition based on the item's partition key.

As shown, in some embodiments, the request router 142 may be configured to implement a key overloading function, via components 144, 145, and 146. The facet schema reader 144 may be used to obtain the facet schemas for an item. For example, when a new item is added to the table or when an existing item is updated, as requested via the request 135, the facet schema reader may obtain the facet schemas for the item in order to determine what instances are to be created or updated for the item, and which attributes should be used as keys for the item.

In some embodiments, the facet schemas may specify the keys for different item instances, for example, a partition key or sort key combination. In some embodiments, the facet schemas may be defined for the entire table, for example at the time the table is created. In some embodiments, item-specific facet schemas may be defined, for example when an item is inserted. In some embodiments, the facet schemas may be stored as table-level metadata. In some embodiments, the facet schemas may be stored on a per-item basis, for example, as part of the primary instance of a data item. In some embodiments, in response to an insert request, the facet schema reader 144 may parse the request 135 and extract from the request the facet schemas to use for the incoming item. In some embodiments, in response to an update request 135, the facet schema reader 144 may retrieve the facet schemas for the item from the table 160. The facet schemas are then used to generate multiple instances of the item for the insert or update request 135, using the item instance generator 145.

In some embodiments, the item instance generator may generate a separate item instance for each schema facet that exists for the item or the table. In some embodiments, one item instance may be specified to be the primary instance, and all other instances are specified to be secondary instances. In some embodiments, the primary instance is stored in the table 160 with the facet schema information for all secondary instances. All of the generated instances are then send to the storage nodes 150, in order to insert or update the instances. According, at the end of the insert or update operation, the table 160 will contain multiple instances for the single item, stored according to different keys as specified by the facet schemas.

In some embodiments, the item instance generator 145 may transform the update or insert request with additional data, and forward the request to the storage nodes 150. In some embodiments, the item instance generator 145 actually generate a new item instance, or some other intermediate representation of the item instance that is acceptable to the storage nodes 150 according to the API presented by the storage nodes.

In some embodiments, the table 160 may include one or more overloaded key fields, such as an overloaded partition key field or an overloaded sort key field. Each item in the table 160 will have these two overloaded fields. In some embodiments, the item instance generator 145 may copy values from other attributes of the item in the request to these overloaded key fields. The copying may be done according to the facet schemas for the item. For example, if a facet schema specifies that an item has a facet with the customerID as the partition key and the orderDate as the sort key, the item instance generator 145 will copy the value of the customerID attribute to the overloaded partition key field and the value of the orderDate attribute to the overloaded sort key field. As may be understood, an item with multiple facet schemas will result in multiple instances, each having a different set of values in the overloaded key fields.

As shown, in some embodiments, the generated item instances are then provided to the request dispatcher 146, which may be tasked with sending 149 the instances to the storage nodes 150 to be stored in different partitions of the table 160. In some embodiments, the request dispatcher may send the instances to different selected partition groups of storage nodes. In some embodiments, each partition of the table 160 may be managed by a different partition group, and items are assigned to a partition based on their partition key values.

As shown, the result of the key overload may be manifested in table 160. As shown, table 160 may store three item instances 170, 180, and 190 for a single item. In some embodiments, some items may have more instances than others, depending on the number of facets that is specified for the items. As shown, in some embodiments, one item instance may be specified to be the primary instance 170. In some embodiments, the primary instance may have a set of key attributes 172, which is defined by a primary facet schema. The primary instance may also have other attributes 174 in addition to its key attributes 172. In some embodiments, the other facet schemas for the item are also stored as part of the primary instance 170. Here, there are two secondary facet schemas A 176 and B 178. In some embodiments, these facet schemas may be stored in a list data structure in an additional attribute of the primary instance. As discussed, in some embodiments, when the item is updated, the primary item instance is updated first, and the secondary item instances are updated asynchronously, based on the facet schemas stored in the primary instance. In some embodiments, the lack of the facet schema metadata may indicate that the instance is not a primary instance. In some embodiments, item instances that lack this facet schema metadata cannot be updated directed by a client request.

As shown, in this example, the item has two secondary instances 180 and 190. The two secondary instances may each have its own set of key attributes 182 and 192, defined according to their respective facet schemas. In some embodiments, the facet schemas may also define a list of projected attributes, such as projected attributes 184 and 194. In some embodiments, the projected attributes may be a subset of the attributes contained in the primary item instance 170. Thus, each secondary item instance may have a different set of projected attributes. In some embodiments, only the projected attributes may be returned in response to a query. In some embodiments, the secondary instances may also include hidden attributes that are stored for uniqueness enforce or other reasons. However, these hidden or unprojected attributes may not be returned in response to a client query.

FIGS. 2A and 2B illustrate a create table call and an insert call in a data store that implements key overloading in storage objects, according to some embodiments. In FIG. 2A, an example create table request 200 is shown. In this example, the request is shown in a human readable format. In different embodiments, the request may be formatted different, for example, in JSON format or in a binary format.

As shown, the create table request 200 specifies the table name (Orders). As portion 210 of the request, the request defines a list of attributes of the Order table to be created, and their respective data types. In some embodiments, the data store may create additional fields for the table in response to the create table request. For example, in some embodiments, the data store may create a set of overloaded key fields for the table.

As shown, portions 220, 230, and 240 indicate different facet schemas for the table. In portion 220, the primary facet is defined with the OrderId attribute as the partition key and the CustomerId as the sort key. As discussed in some embodiments, items stored under the primary facet schema (i.e., the primary item instances) may copy the attribute values of attributes indicated in the schema to the overloaded key values, as specified. In some embodiments, the set of keys of the primary facet schema may represent a unique key combination of each item in the table.

As shown, portion 230 shows one secondary facet schema for the table, where the partition key is the item's CustomerId and the sort key is the item's OrderDate. As shown, portion 240 shows another secondary facet schema for the table, where the partition key is the item's RegionId, and the sort key is a composite value of the item's OrderDate concatenated with the item's ZipCode. As can be seen, using these facet schemas, the items in the table can be stored using a variety of different attributes as their key values. In some embodiments, a request router (such as request router 142) may be responsible for populating the partition key and sort key fields for the individual instances of each item. In some embodiments, the populating of the overloaded key fields may include certain transformations. For example, in some embodiments, the key fields may be of a generic data type, such as the STRING type. Thus, attributes of other data types may be translated into the STRING type. For example, a date value of Jan. 1, 2018 may be transformed into the string '2018-01-01' before it is stored in an overloaded key field.

In this example, the three facet schemas are defined at the table level. Thus, all items inserted into the table may generate three instances according to the three facet schemas. However, in some embodiments, facets may be specified on a per-item basis. For example, in some embodiments, the first time an item is inserted, the insert request may specify the facet schemas for the item, as shown in FIG. 2B. Thus, different items in the table may have different facets.

As shown in FIG. 2B, an example "put item" or insert request 250 is shown for the Orders table. In portion 260 of the request, the values of the new item are provided. In section 270, the primary facet schema 270 is specified. As discussed, in some embodiments, the key combination in the primary facet schema comprises a unique identifier of an item in the table. Thus, in this example, the insert request 250 inserts a single item in the table, where the OrderID is '123' and the CustomerId is 'Bob', and may enforce a uniqueness constraint on the primary instance generated as a result of primary facet schema.

As shown, the insert request 250 also defines two secondary facet schemas at portions 280 and 290. Thus, this request represents an example where facet schemas can be defined for individual items. In portion 280, the partition key is the item's CustomerID and the sort key is the item's OrderDate. In portion 290, the partition key is the item's RegionId and the sort key is the item's OrderDate. As discussed, when the item is inserted, the request router may populate the overloaded key fields of the item with their specified attributes' values.

As shown, both the schemas specified in portions 280 and 290 also specify a set of projected attributes. As discussed, these projected attributes may be a subset of the attributes of the primary instance of the item. In some embodiments, only the projected attributes of the item instance may be returned in response to a query.

As shown, in the schema of portion 280, an OnKeyCollision setting is specified. In some embodiments, this setting may specify how a unique key collision should be handled when inserting or updating a secondary instance of an item. Although the key set of the primary instance uniquely identifies each item in the table, the key set specified by the secondary facet schema does not provide such guarantees. Thus, in some embodiments, the secondary facet schema may specify one of several options to handle such unique key collisions. In some embodiments, the collision may be handled by forcing the incoming secondary instance to be unique, as shown. In some embodiments, this may be performed via a transformation of the secondary instance, for example, to appending one or more key values of the primary item instance to the secondary item's keys. In this manner, when collisions occur, they are avoided by adjustments to the secondary instance's key values. In some embodiments, another key collision option may be to simply overwrite a less recently updated one of the two colliding instances with the more recently updated one. In some embodiments, another option may be to fail the update or insert with respect to that secondary instance and report the failure back to the client. In some embodiments, the client may be in a better position to take corrective measures, for example, to manually change the key values of the secondary instance.

As shown, in the schema of portion 290, a FacetName is provided. In some embodiments, a facet schema may be "named," so that it can be implemented as an isolated schema that can be queried in isolation. In some embodiments, the isolation may be implemented by salting a key value of the secondary instance, for example the partition key value. In some embodiments, the salting may involve incorporating a special token into the partition key value before the partition key value is hashed to determine the partition. In some embodiments, the salting token may be generated to ensure that items inserted under the isolated schema are all assigned to a set of isolated partitions, so that a subsequent query that identifies the isolated partition will only receive results from that isolated schema.

Figure 3:
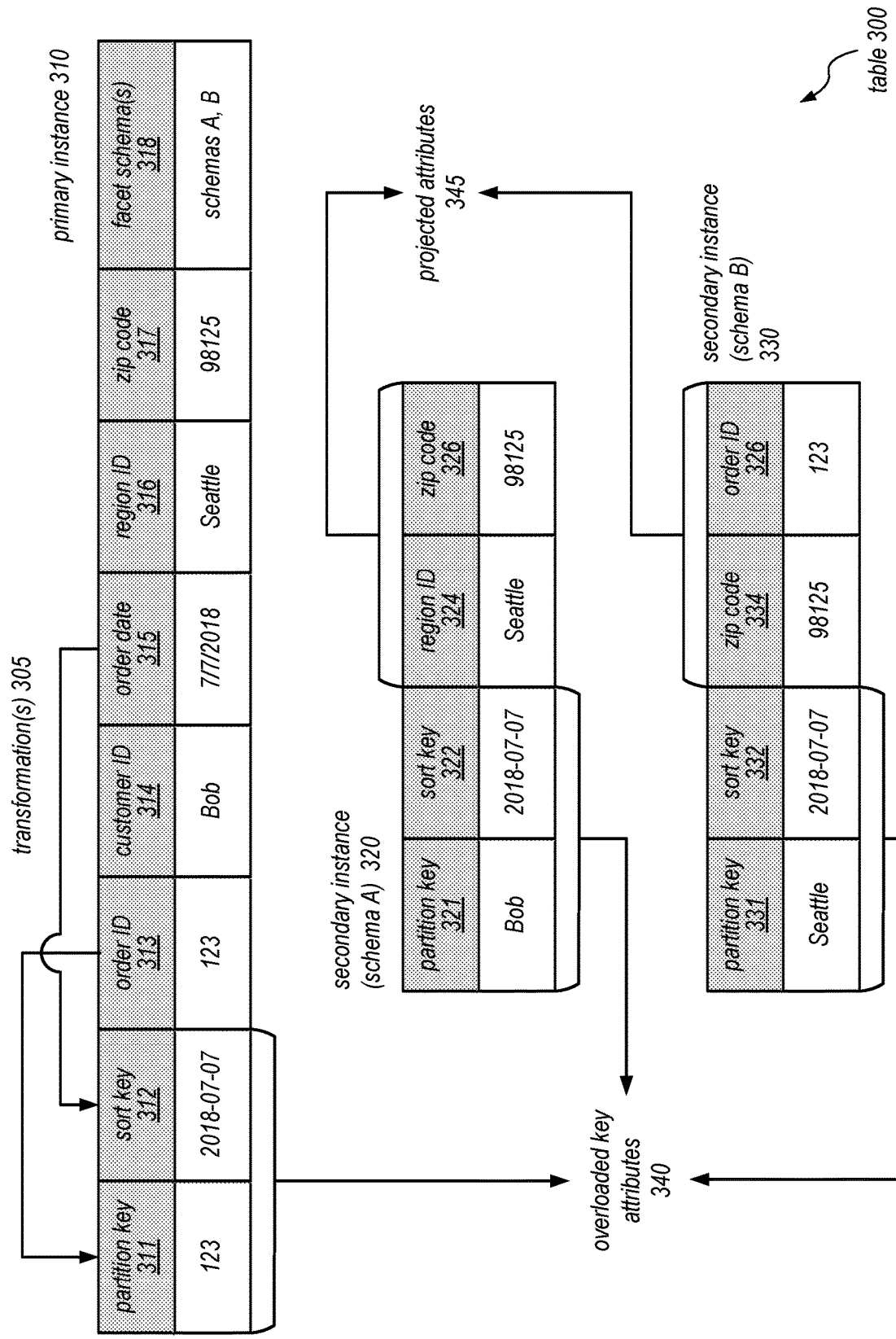
FIG. 3 illustrates data items in a table that supports key overloading, according to some embodiments.

FIG. 3 illustrates data items in a table that supports key overloading, according to some embodiments. As shown, the figure illustrates three item instances 310, 320, and 330 for a single item in the table. These item instances may be generated as a result of a single insert request, for example, insert request 250 of FIG. 2B.

As shown, in this example, the primary instance 310 contains all attributes of the item. The primary instance 310 also contains the overloaded partition key field 311 and overloaded sort key field 312. As specified in the insert request 250, these fields are appropriately populated with other attribute values of the item via transformations 305, as shown. In addition, the primary instance 310 also contains a metadata field 318, which may store the facet schemas for the secondary instances 320 and 330.

As shown, the secondary instances 320 and 330 are populated and stored according to the insert request 250. As shown, each secondary instance has a set of different partition key and sort key attributes in the overloaded key fields 340. Each instance also has a different set of projected key attributes. In some embodiments, the partition key value selects the partition of the item instance, and the sort key determines the sort placement of the item instance in the selected partition. Thus, in this example, the three different instances may be stored in three different partition groups and in different sort orders with their respective partition groups.

Figure 4:
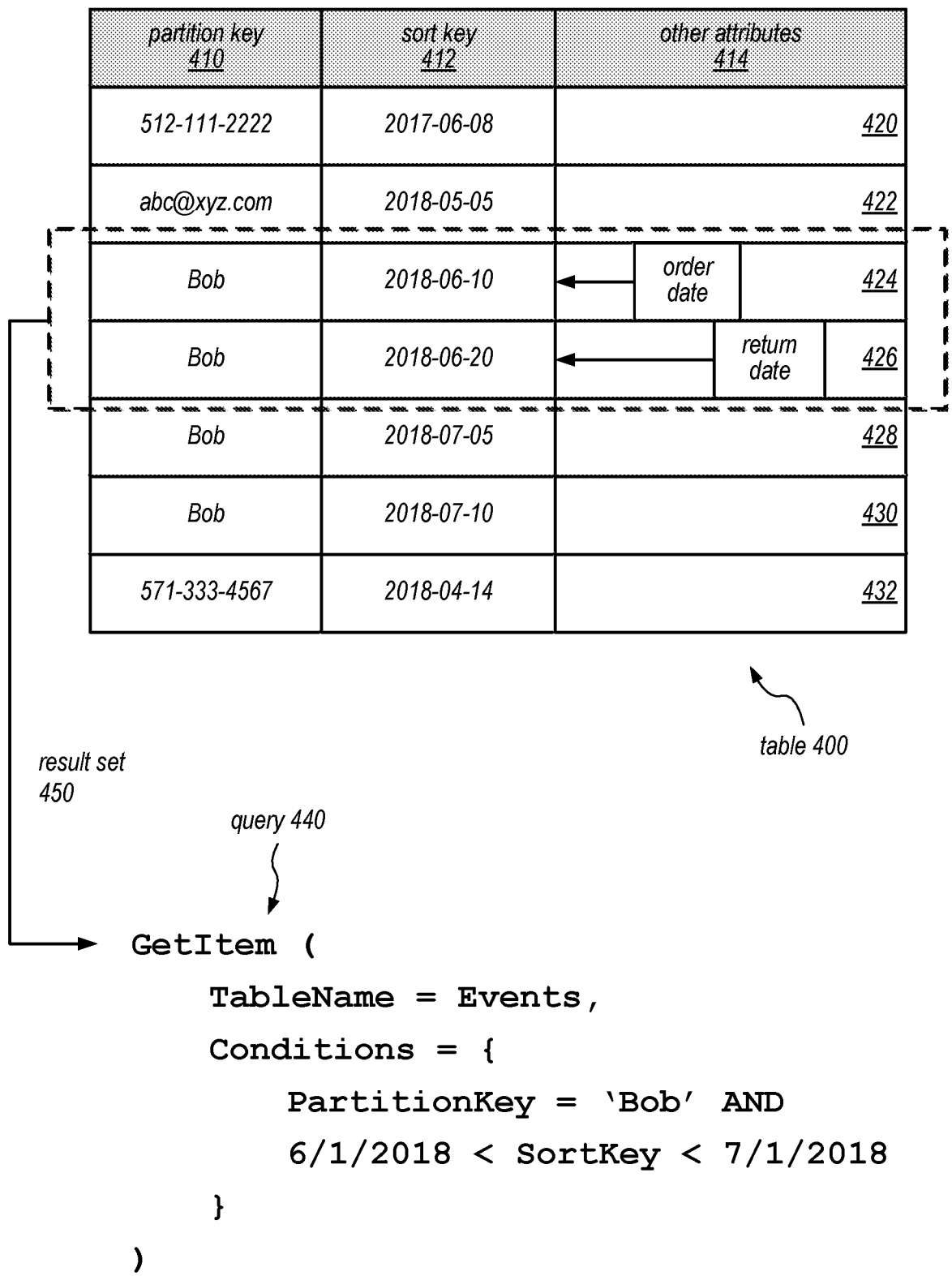
FIG. 4 illustrates a query in a data store that implements key overloading in storage objects, according to some embodiments.

FIG. 4 illustrates a query in a data store that implements key overloading in storage objects, according to some embodiments. As shown, the figure depicts a table 400 that is queried via a query 440, returning a result set 450.

As shown, the table 400 is a key overloaded table with different types of values for its partition key 410 and sort key 412. This example represents one use case for a key overloaded table. In this example, the partition key field 410 may be used to hold different types of identifiers of customers. For example, in some item instances, the CustomerId attribute (e.g., 'Bob') is used. In some instances, a phone number or email address is used. Thus, a single customer may be stored as three different instances, based on its different forms of customer identifiers. As shown, the sort key field 412 is also overloaded. For example, item instance 424 uses the order date attribute as the sort key, while item instance 426 uses the return date attribute as its sort key. Accordingly, the items in the different facets in the table 400 may be overlaid in a common table space, or sometimes mixed within a single partition. Such overlaying of facets within the table are permitted by default.

In this example, the query asks for all item instances in the table 400 that meets a set of query conditions, where the partition key is 'Bob' and the sort key is a date value between Jun. 1, 2018 and Jul. 1, 2018. As a result, item instances 424 and 426 are returned. In this example, the two items are stored as a result of two different facet schemas that specify different sort key attributes. However, because the two facets can be overlaid with one another, the result set 450 can contain items from both facets.

In this example, the query specifies the sort key range using date values. Thus, in some embodiments, the query handler of the data store may perform a translation of the query to translate values, for example, from date values to string values, as shown. In some embodiments, the query handler may not perform any translations on the query, and the task of translation may be left up to the querying client. Notably, to perform the query 440, the data store does not use any separate index other than the table. Rather, the data items in the table are stored in a particular facet to support the type of query such as query 440.

Figure 5:
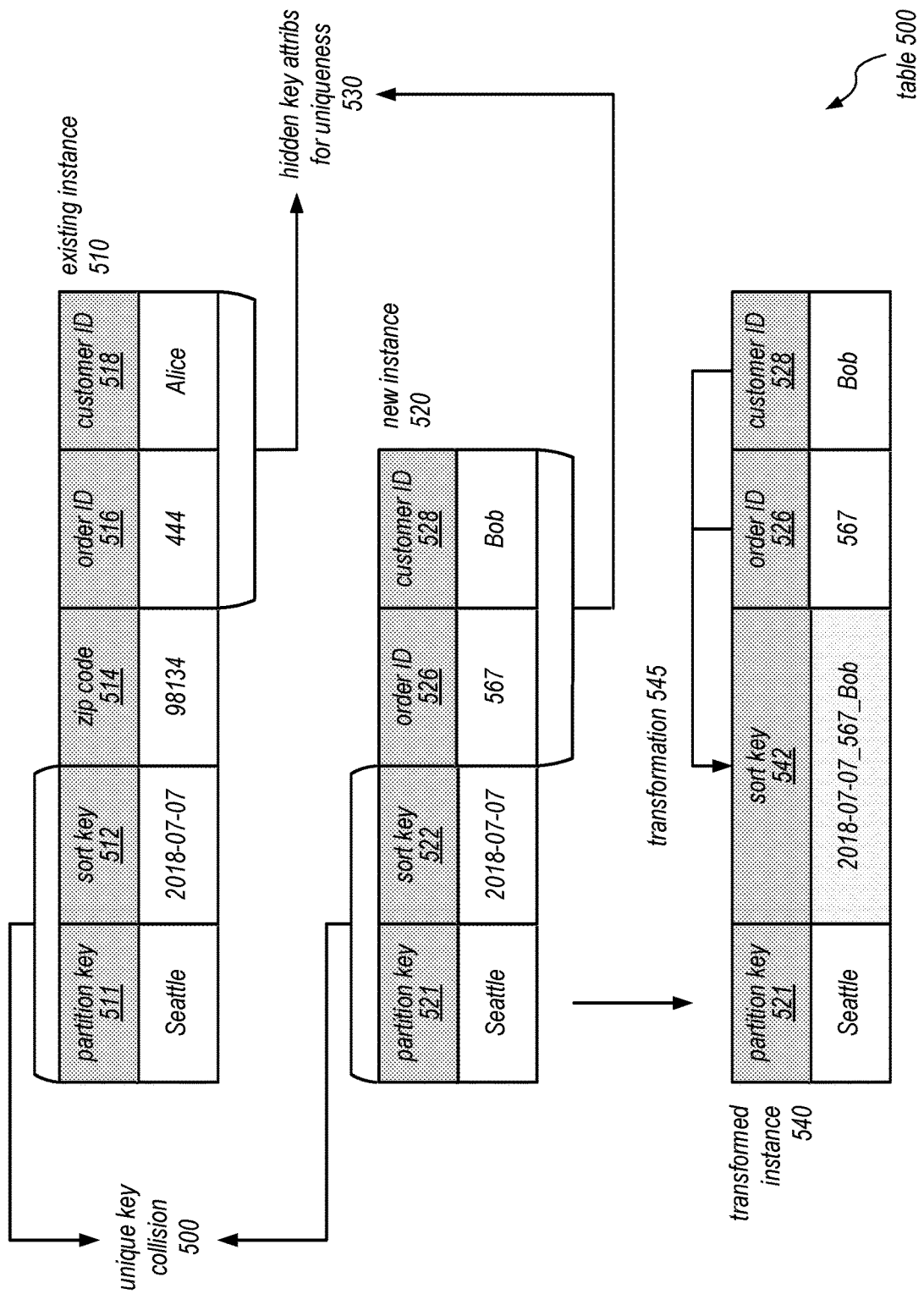
FIG. 5 illustrates a process of handling a key collision in a data store that implements key overloading in storage objects, according to some embodiments.

FIG. 5 illustrates a process of handling a key collision in a data store that implements key overloading in storage objects, according to some embodiments. As shown, the figure depicts a situation where a unique key collision 505 occurs between an existing instance 510 in the table and a new instance 520 to be inserted or updated in the table.

As discussed, in some embodiments, the key set of secondary facet schemas may not guarantee that secondary item instances are unique. In some embodiments, unique key collisions may occur within the same facet. In some embodiments, unique key collisions may occur across different facets. In some embodiments, the data store itself may require that all items in the table be unique with respect to their respective key sets. Thus, a unique key collision 505 will result in an error when inserting or updating a secondary instance 520.

In this example, the data store uses one collision handling option, which may be the default option. In some embodiments, when a unique key collision is detected, the new instance is modified, so that its key values include additional key values from the primary instance. In some embodiments, some of these key values (or other attributes values) from the primary item instance are stored with the secondary instance as hidden key attributes 530, as shown. To avoid the collision, in this example, the primary instance's key values (OrderId and CustomerId) are concatenated to the sort key value of the secondary instance 520. The result is a transformed instance 540. Thus, the transformation 545 avoids the unique key collision 505 by modifying the key values of the secondary instance 520 to produce a new secondary instance 540. As discussed, in some embodiments, other key collision handling options may be specified in the insert or update request.

In some embodiments, because the modification of the sort key values is not known to the client, the client's queries may not reflect the modified values in the table. Thus, in some embodiments, the query engine may perform a transformation of the values in the query to properly match the transformed values in the table. For example, in some embodiments, where a query specified the condition "SortKey EQ 2018-07-07," the query engine may translate the condition to be "SortKey beginsWith 2018-07-07," so that the query can correctly match item instances whose sort keys have been modified, such as instance 540. Likewise, the query condition "SortKey >2018-07-07" will be transformed to "SortKey >2018-07-07@" to properly exclude instances such as instance 540. The query condition "SortKey <2018-07-07" will be transformed to "SortKey <2018-07-07_" to properly exclude instances such as instance 540. Depending on the embodiment and the concatenation technique used, the query translation may be implemented differently.

FIG. 6 illustrates an isolated facet of item in table that supports key overloading, according to some embodiments. As shown, the figure depicts a table 600 that includes items of an isolated facet 640, and items of other facets 630.

As discussed, in some embodiments, table facets are by default overlaid facets, where items of different facets can coexist in the same table space or same partitions of the table. However, in some embodiments, the data store may implement a named or isolated facet, where the items in the facet are forced to reside in a set of isolated partitions, so that a target query that identifies the isolated facet will only return items from that facet.

As shown, in this example, the items 640 belong to an isolated facet for only 'Bob'. In some embodiments, the isolated facet may be implemented by salting a key value, such as the partition key value, of all items under that facet with a special token. In some embodiments, the token may be appended or otherwise incorporated into the partition key value before the partition key value is hashed to determine a partition for the items. In some embodiments, the token may be added after the hashing. In some embodiments, the token may ensure that any item in the isolated facets are mapped to a partition that is not shared by any other facets of the table.

As a result, while general queries against overlaid facets 635 may return items from multiple facets, a targeted query for a particular isolated facet 645 will only return items in the isolated facet. In some embodiments, the query may specify a name of the isolated or named facet, which may be used by the data store to look up the token used to salt the key values of items in the isolated facet. In some embodiments, the client may salt the query values itself. In some embodiments, for example, the salt token may be returned to the client as the result of a table creation of insert request, which initially specified the facet schema for the isolated facet. Thus, the client can use the token to translate data values in its subsequent queries.

Figure 7:
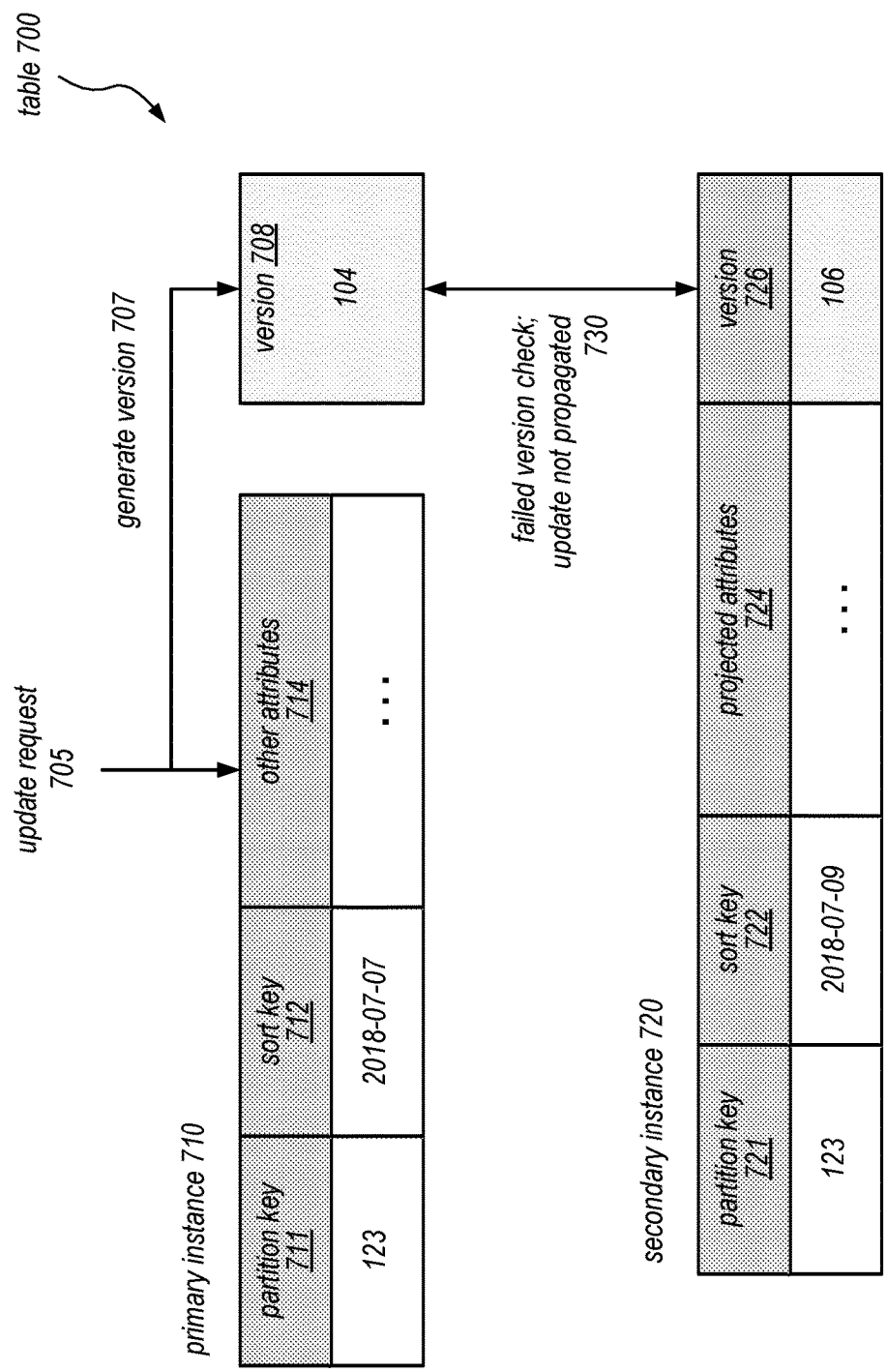
FIG. 7 illustrates an update operation that performs a version check in a table that supports key overloading, according to some embodiments.

FIG. 7 illustrates an update operation that performs a version check in a table that supports key overloading, according to some embodiments. As shown, the figure depicts an update request 705 to a primary instance 710, which triggers a update propagation attempt to a secondary instance 720.

As discussed, in some embodiments, the propagation of the update to the secondary instance of an item may be performed lazily. That is, in some embodiments, such propagation may not be performed immediately as the primary instance is updated. In some embodiments, the data store may acknowledge the update request as successful before the secondary instances are updated. However, because these propagations can occur asynchronously, on some occasions, the updates may arrive at the secondary instance 720 out of order. Thus, to address this problem, a version check is used to ensure that out-of-date updates are not propagated to the secondary instances 720.

As shown, in this example, the secondary instance 720 includes a version field 726. In some embodiments, the primary instance 710 may also maintain a version field that reflects its last update. In some embodiments, the stored version of the primary instance 710 will always be greater or equal to the version 726 stored in its associated secondary instances. In some embodiments, when the update request 705 is received, a version 708 (e.g., a version number) is generated 707. In some embodiments, the version 708 may simply reflect the timestamp of the update request. In some embodiments, the version may represent a sequence number of the update request. In some embodiments, the version number may be generated by incrementing the value stored in version field of the primary instance.

When the updates are propagated to the secondary instances (e.g., via asynchronous overwrites), the version number generated for the update request 705 is compared with the current version number of the secondary instance 720. If the version of the request is newer, this indicates that the secondary instance 720 has not yet seen an update that is later than pending update. In that case, the update propagation may proceed. However, if the version of the request is older than the version of the secondary instance 720, as in the depicted example, this indicates that the secondary instance 720 has already received an update propagation from a later update to the primary instance. In that case, the pending update will not be performed, so that the correct ordering of updates is enforced.

In some embodiments, the checking of the version and the update of the secondary instance 720 may be performed as a conditional update. In some embodiments, the conditional update is performed in an atomic fashion, so that no intervening writes to the version 726 can occur between the check and the updating of the secondary instance 720. As discussed, in some embodiments, the updating of the secondary instance may actually entail an overwriting of the entire instance, i.e., a delete of the instance followed by the recreation of the instance.

Figure 8:
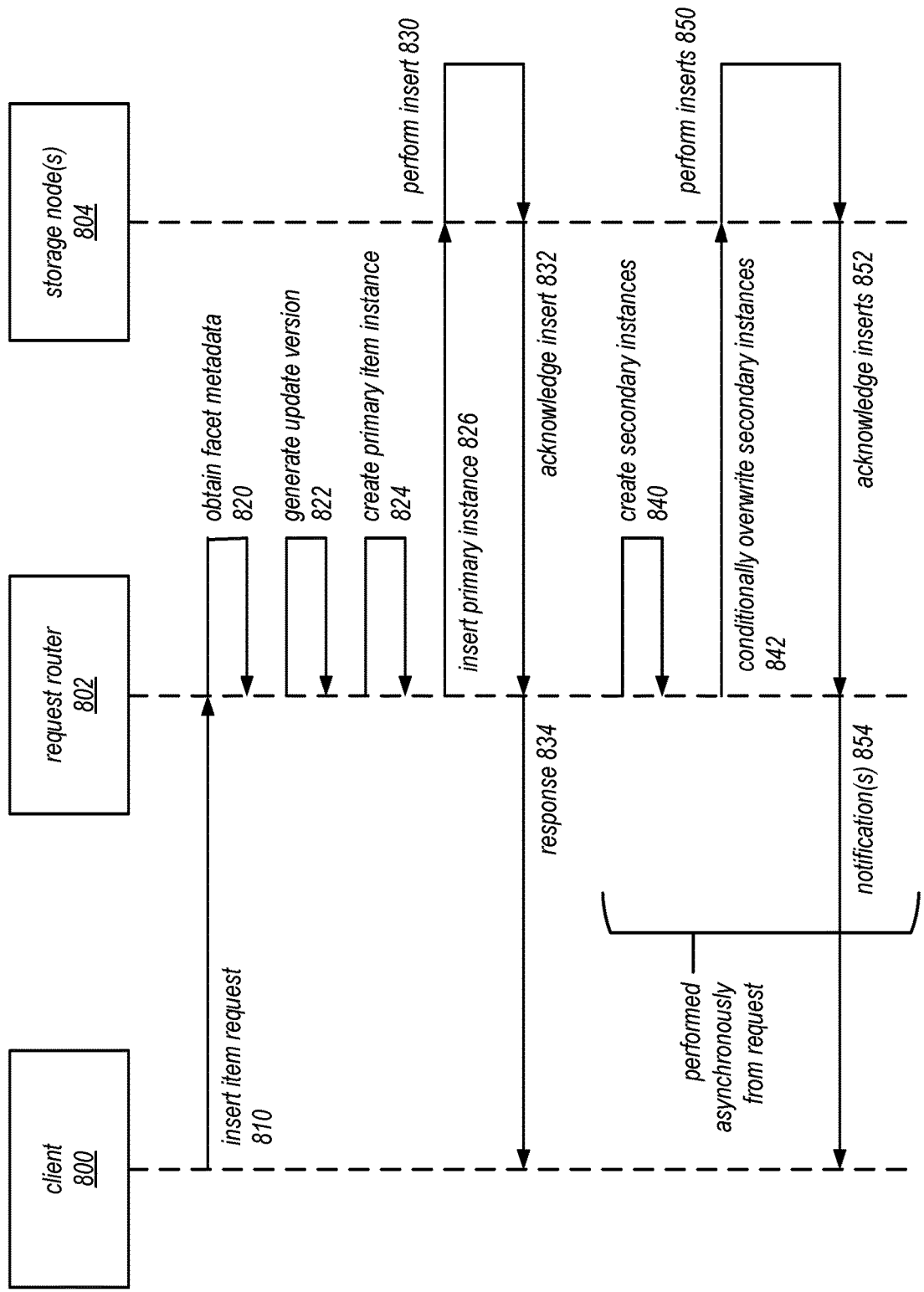
FIG. 8 is a system sequence diagram illustrating a process of performing an insert operation in a data store that implements key overloading in storage objects, according to some embodiments.

FIG. 8 is a system sequence diagram illustrating a process of performing an insert operation in a data store that implements key overloading in storage objects, according to some embodiments. As shown, the figure depicts interactions between the client 800, the request router 802, and the storage nodes 804 as a result of an insert item request 810. In some embodiments, the request router 802 may be the request router 142 of FIG. 1, and the storage nodes 804 may be the storage nodes 150 of FIG. 1.

As shown, the process begins when an insert item request 810 is received by the request router 802. The request router 802 then obtains facet metadata for the item at operation 820. In some embodiments, the facet metadata may be previously defined at the table level and obtained from the data store. In some embodiments, the facet metadata may be specified on for the individual item and specified in the request 810 itself. The facet metadata may include for example, one or more facet schemas for inserting the item. In some embodiments, facet metadata may be stored at multiple levels. For example, in some embodiments, the table itself may specify a default set of facets, which may be specified at the creation time of the table. Without more, all items inserted into the table will generated instances according to the default facets. However, in some embodiments, insert requests that specify their own facet schemas will override the default facet schema metadata stored at the table level. Thus, particular items may be stored using customized facet schemas.

At operation 822, an update version is generated for the item insert. In some embodiments, the version checking is also performed on inserts to guard against items that may previously exist in the data store or a recently updated item.

At operation 824, a primary item instance is created. In some embodiments, the primary item instance is embodied in a modified creation request to be sent to the storage nodes 804. In some embodiments, the primary item instance represents a data structure or representation of the item itself. In some embodiments, the primary item instance may include a set of overloaded key fields, such as a partition key field and a sort key field, which are populated with appropriate values from the item's other attributes, as specified by the primary facet schema.

At operation 826, the primary instance is provided to the storage nodes 804 to be inserted into the table, and at operation 830, the storage node performs the insert. As discussed, the insert is performed in accordance with the primary instance's specified partition key and sort key values, so that the item is assigned to a partition based on the instance's partition key value and sorted within the partition according to the instance's sort key value.

At operation 832, the storage nodes 804 acknowledges the insert back to the request router 802. At operation 834, the request router 802 may respond back to the client, indicating that the insert was successful. In some embodiments, this response may be provided before the insert is propagated as secondary instance of the item. As shown, in some embodiments, the propagation operations may be performed asynchronously from the request.

At operation 840, the request router 802 begins the propagation process by creating the secondary instances of the item. The secondary instances may be created according to the facet metadata that was obtained at operation 820.

At operation 842, the request router 802 conditionally overwrites the secondary instances. In some embodiments, the overwrite may involve a delete of the secondary instance followed by an insert of the newly created secondary instance. In some embodiments, the overwrite is performed conditionally, based on the condition that the version number generated in 822 is greater or newer than a current version number of the secondary instance. In some embodiments, the overwrite is performed by sending a conditional write request to the storage nodes 804, and in response, the storage nodes carry out the request in operation 850.

At operation 852, the storage nodes 804 acknowledges the inserts back to the request router 802. At operation 854, the request router 802 provides notifications back to the client regarding the results of secondary instance inserts. In some embodiments, these notifications may be provided asynchronously from the response 834. In some embodiments, these notifications may be provided individually for each different secondary instance. In some embodiments, the client may register to the data store via a call back interface in order to receive these notifications.

Figure 9:
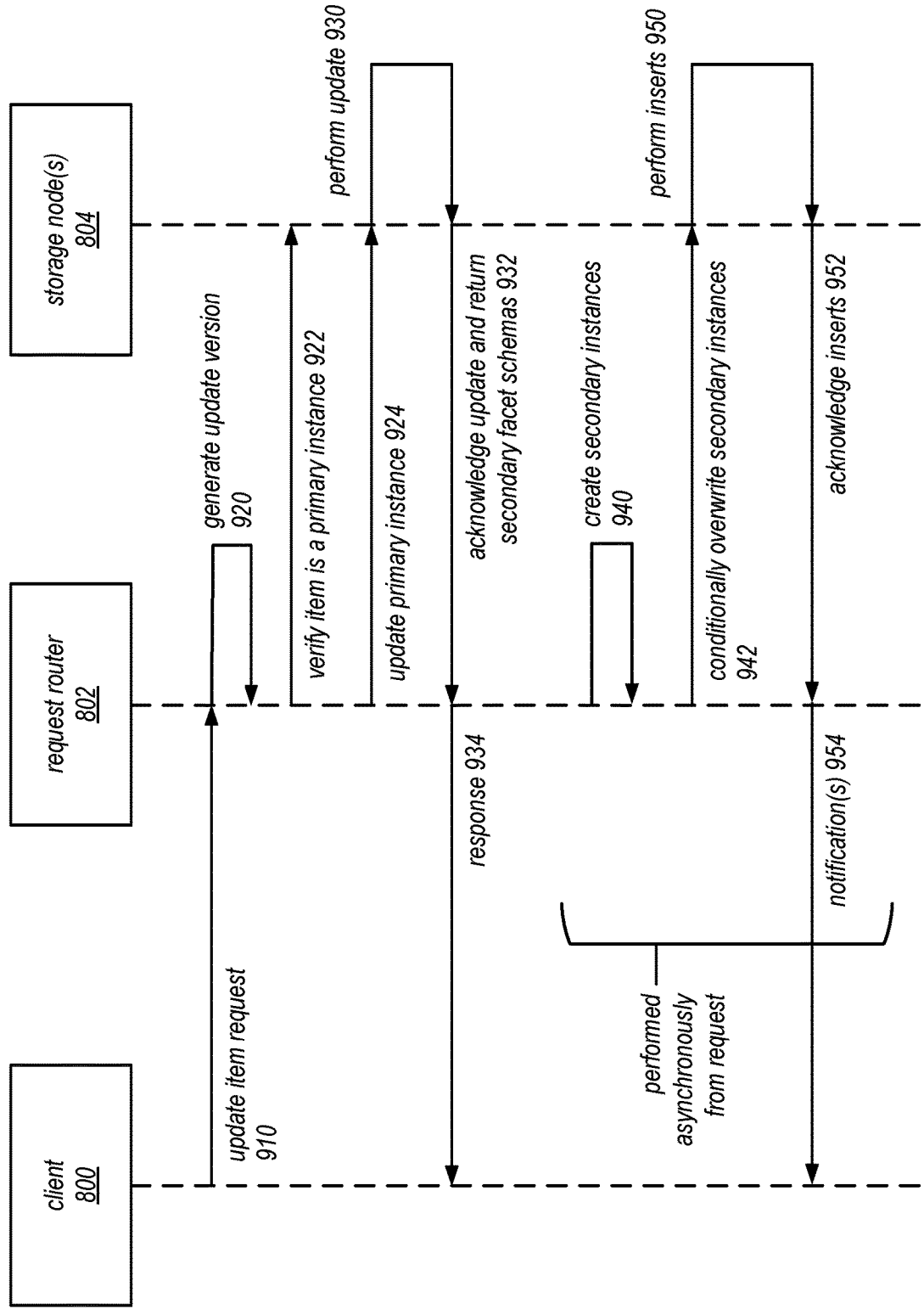
FIG. 9 is a system sequence diagram illustrating a process of performing an update operation in a data store that implements key overloading in storage objects, according to some embodiments.

FIG. 9 is a system sequence diagram illustrating a process of performing an update operation in a data store that implements key overloading in storage objects, according to some embodiments.

As shown, the process begins when an update item request 910 is received by the request router 802. At operation 920, an item version is generated for the item update. In some embodiments, the version checking is performed to ensure that asynchronous update propagations are not performed out of order, and to ensure consistency among the different instances of the item.

At operation 922, the request router 802 verifies that the item being updated is a primary instance. As discussed, in some embodiments, only the primary instance of an item can be directed updated by a client request. The secondary instances are only updated by the data store via update propagations. Thus, in some embodiments, the request router verifies that the item is a primary instance by, for example, checking that the item in the table contains facet metadata for secondary instances.

At operation 924, the primary instance is provided to the storage nodes 804 to be updated. A partition group may be selected from the storage nodes 804 based on the partition key value specified in the update request, and the item may be found using sort key values specified in the update request, if any. At operation 930, the storage nodes 804 perform the update according to the request.

At operation 932, the storage nodes 804 acknowledges the update back to the request router 802. As shown, in some embodiments, the storage nodes 804 may also provide the secondary facet schemas back to the request router. In some embodiments, these secondary facet schemas are stored with the primary instance of the item, and they may be returned as a response to the updating of the primary instance. At operation 934, the request router 802 may respond back to the client, indicating that the update was successful. In some embodiments, this response may be provided before the update is propagated to the secondary instance of the item. As shown, in some embodiments, the propagation operations may be performed asynchronously from the request.

At operation 940, the request router 802 begins the propagation process by creating the secondary instances of the item. The secondary instances may be created according to the secondary facet schemas that were received at operation 932.

At operation 942, the request router 802 conditionally overwrites the secondary instances. In some embodiments, the overwrite may involve a delete of the secondary instance followed by an insertion of the newly created secondary instance. In some embodiments, the overwrite is performed conditionally, based on the condition that the version number generated in 920 is greater or newer than a current version number of the secondary instance. In some embodiments, the overwrite is performed by sending a conditional write request to the storage nodes 804, and in response, the storage nodes carry out the request in operation 950.

At operation 952, the storage nodes 804 acknowledges the inserts back to the request router 802. At operation 954, the request router 802 provides notifications back to the client regarding the results of secondary instance inserts. In some embodiments, these notifications may be provided asynchronously from the response 934. In some embodiments, these notifications may be provided individually for each different secondary instance. In some embodiments, the client may register to the data store via a call back interface in order to receive these notifications.

Figure 10A:
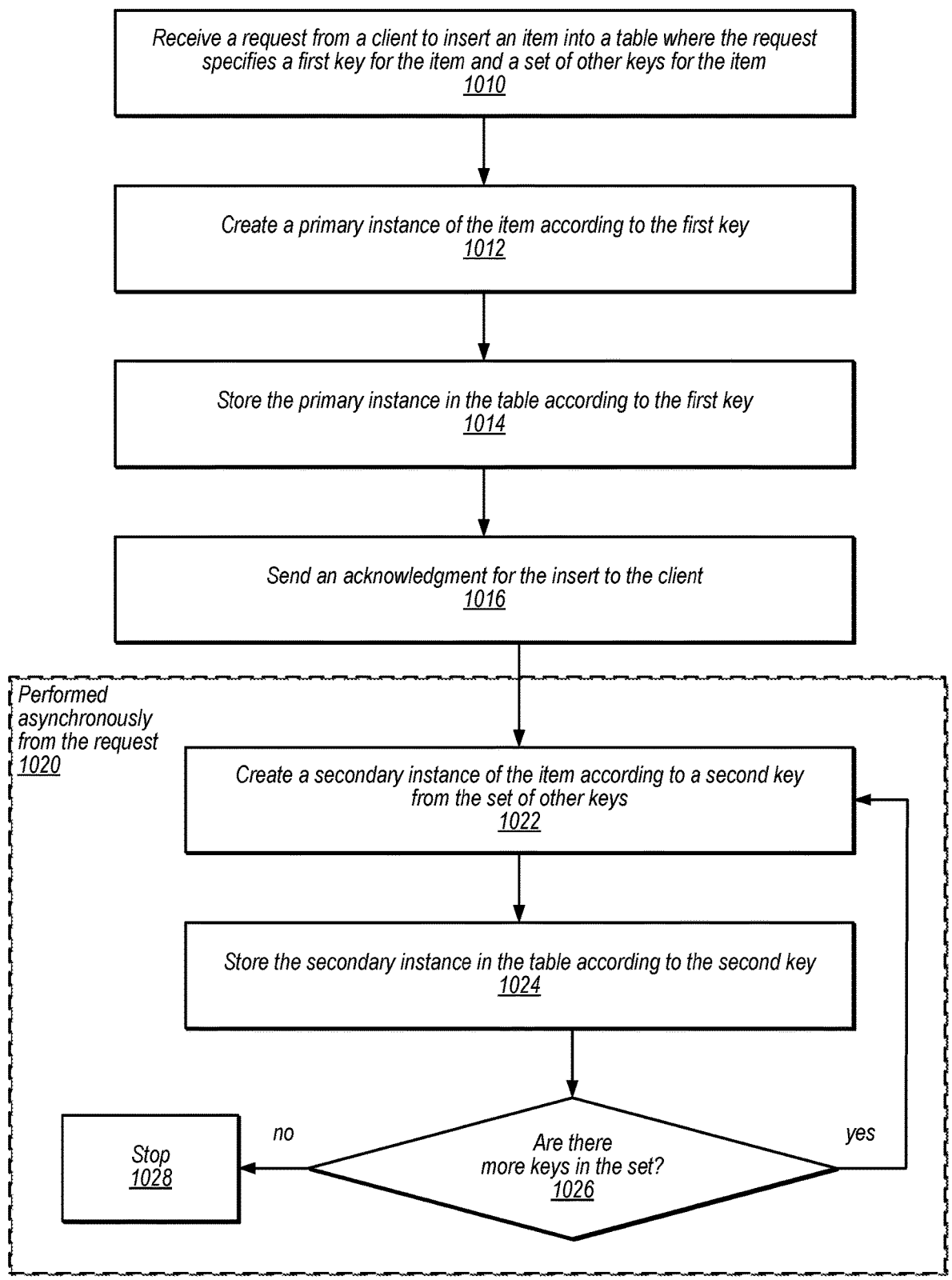
FIGS. 10A and 10B are diagrams charts illustrating different processes of performing an insert operation in a data store that implements key overloading in storage objects, according to some embodiments.
Figure 10B:
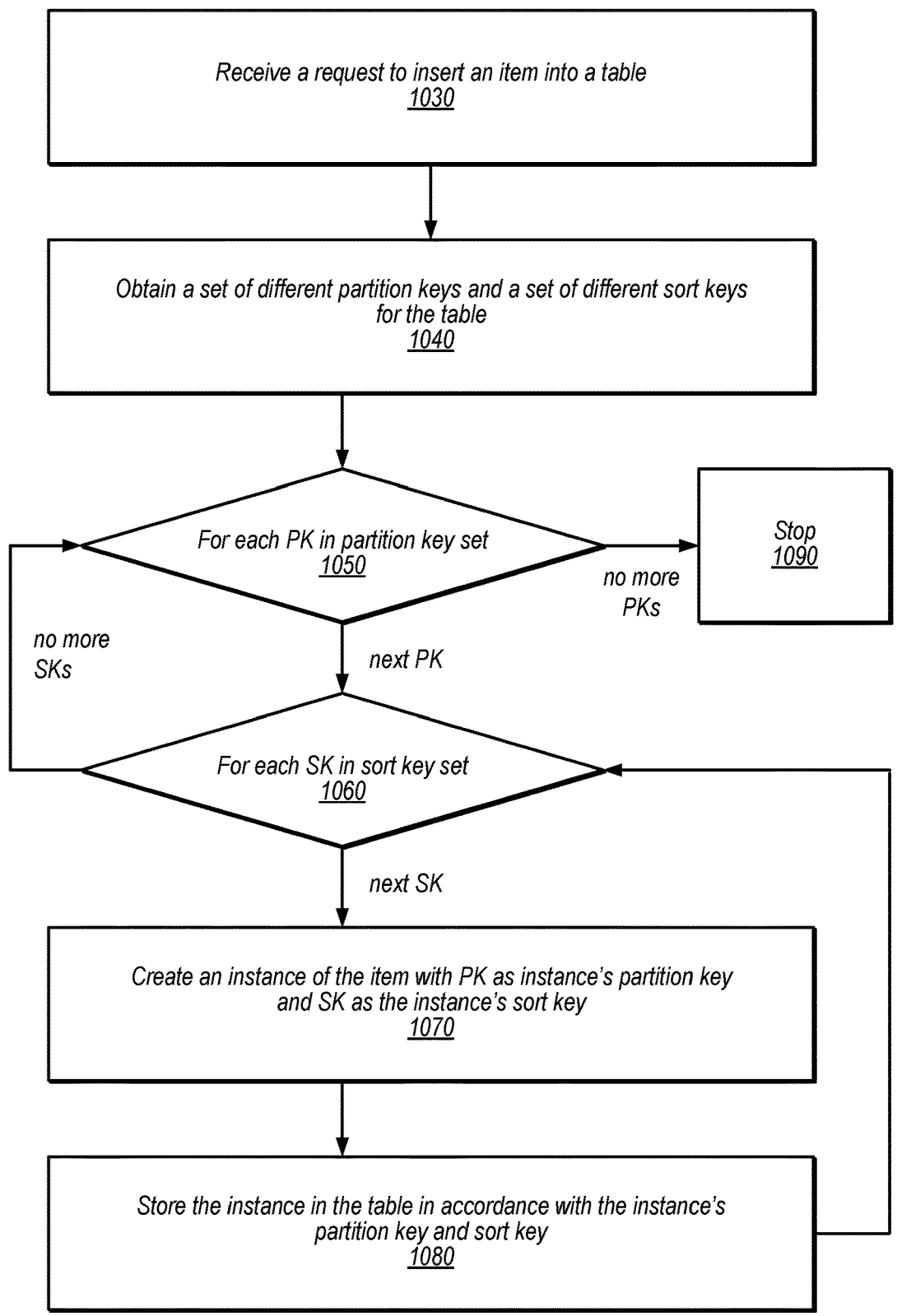

FIGS. 10A and 10B are diagrams charts illustrating different processes of performing an insert operation in a data store that implements key overloading in storage objects, according to some embodiments. The operations of FIGS. 10A and 10B may be performed, for example, by the request router 142 or the storage nodes 150, as discussed in connection with FIG. 1.

The process of FIG. 10A illustrates an insert operation where the insert request specifies alternate keys for an item. The process begins at operation 1010, where a request is received from a client to insert an item into a table. The request may specify a first key for the item and a set of other keys for the item. In some embodiments, the first key may be an attribute of the item to be used as a partition key or sort key for a primary instance of the item. In some embodiments, the set of second keys may be alternative partition keys attributes or sort key attributes to be used for secondary instances of the item. In some embodiments, the insert request may specify a set of facet schemas, including a primary facet schema and a secondary facet schema, as shown in FIG. 2B. These schemas may be parsed by the request handler and used to create the multiple instances of the item.

At operation 1012, the primary instance of the item is created according to the first key. In some embodiments, the creation may involve modifying the insert request to be sent to storage nodes. In some embodiments, the creation may create a data representation of the primary instance to be inserted. In some embodiments, the creation involves copying attribute values of specified attributes in the item, according to the primary facet schema, into one or more overloaded key fields in the primary instance. In some embodiments, the primary instance has an overloaded partition key field and an overloaded sort key field.

At operation 1014, the primary instance is stored in the table according to the first key. In some embodiments, a request router node may send the primary instance to a partition group of the table to be stored. In some embodiments, the table is divided into a number of partitions, each managed by a group of storage nodes. In some embodiments, the primary instance is assigned to a partition group according to the value of its partition key. In some embodiments, the primary instance is stored in the partition in a sorted order according to the value of its sort key.

At operation 1016, an acknowledgment of the insert is sent to the client. In some embodiments, the acknowledgement may provide, according to the API provided by the data store, the values of the primary instance that was stored in the table. In some embodiments, if the insert was not successful, a response is provided to the client indicating the failure.

As shown, the process then proceeds to a next stage, where the secondary instances of the item are created and stored. As shown, the next stage 1020 may be performed asynchronously from the insert request and response interaction. Thus, for example, the secondary instances may be stored after the acknowledgment is sent in operation 1018, and at a time of the data store's choosing.

At operation 1022, a secondary instance of the item is created according to a second key from the set of other keys. In some embodiments, the second key may be an item attribute to be used as an alternate partition key or alternate sort key of the secondary instance. The second key may be defined in a secondary facet schema specified in the insert request. In some embodiments, the creation may involve modifying the insert request to be sent to storage nodes or creating a data representation of the secondary instance to be inserted. In some embodiments, the creation involves copying attribute values of specified attributes in the item, according to the secondary facet schema, into one or more overloaded key fields in the secondary instance.

At operation 1024, the secondary instance is stored in the table according to the second key. In some embodiments, the request router node may send the secondary instance to a partition group of the table to be stored. In some embodiments, the secondary instance is assigned to a partition group of the table according to the value of its partition key. In some embodiments, the secondary instance is stored in the partition in a sorted order according to the value of its sort key.

At operation 1026, a determination is made whether there are more keys in the set of alternate key set. As discussed, in some embodiments, the insert request may define multiple alternate key attributes or multiple table facet schemas. The process loops through all specified alternate keys or facet schemas to generate a different item instance for each alternate key or facet schema. All of these instances are then stored in the table according to their different key values. If there are no more keys in the set, the process stops at operation 1028.

The process of FIG. 10B illustrates an insert operation where different partition keys and sort keys are specified for an incoming item. At operation 1030, a request to insert an item into a table is received. Operation 1030 may be performed in similar fashion as discussed in connection with operation 1010. However, in some embodiments, the insert request in this figure may not specify table facet schemas.

At operation 1040, a set of different partition keys and a set of different sort keys are obtained for the table. In some embodiments, these sets of keys may be specified for the table when the table was created. In some embodiments, these keys may be specified for a large number of items to be inserted, for example, by a batch insert request.

In this example, the set of partition keys are the set of sort keys are defined separately, and one item instance will be stored for each combination of one partition key and one sort key. For example, for a set of three alternate partition key and three alternate sort keys, nine separate item instances will be stored. As shown, operations 1050 and 1060 implement a nested loop. The outer loop first cycles through all keys in the partition key set, and the inner loop cycles through all keys in the sort key set. Accordingly, operations 1070 and 1080 are performed for every partition key/sort key combination. The process stops at operation 1090 when no more partition key/sort key combinations remain.

At operation 1070, an instance of the item is created with one partition key PK from the partition key set and one sort key SK from the sort key set. The creation of the instance may be performed in similar fashion as discussed in connection with operations 1012 and 1022. For example, in some embodiments, the data store may copy the values of the partition key PK and sort key SK in the item into a set of overloaded partition key and sort key fields.

At operation 1080, the created instance is stored in table in accordance with its partition key and sort key. Operation 1080 may be performed in similar fashion as operations 1014 and 1024. For example, in some embodiments, the instance may be assigned to a partition based on its partition key value and stored in the partition in sorted order based on its sort key value.

Figure 11A:
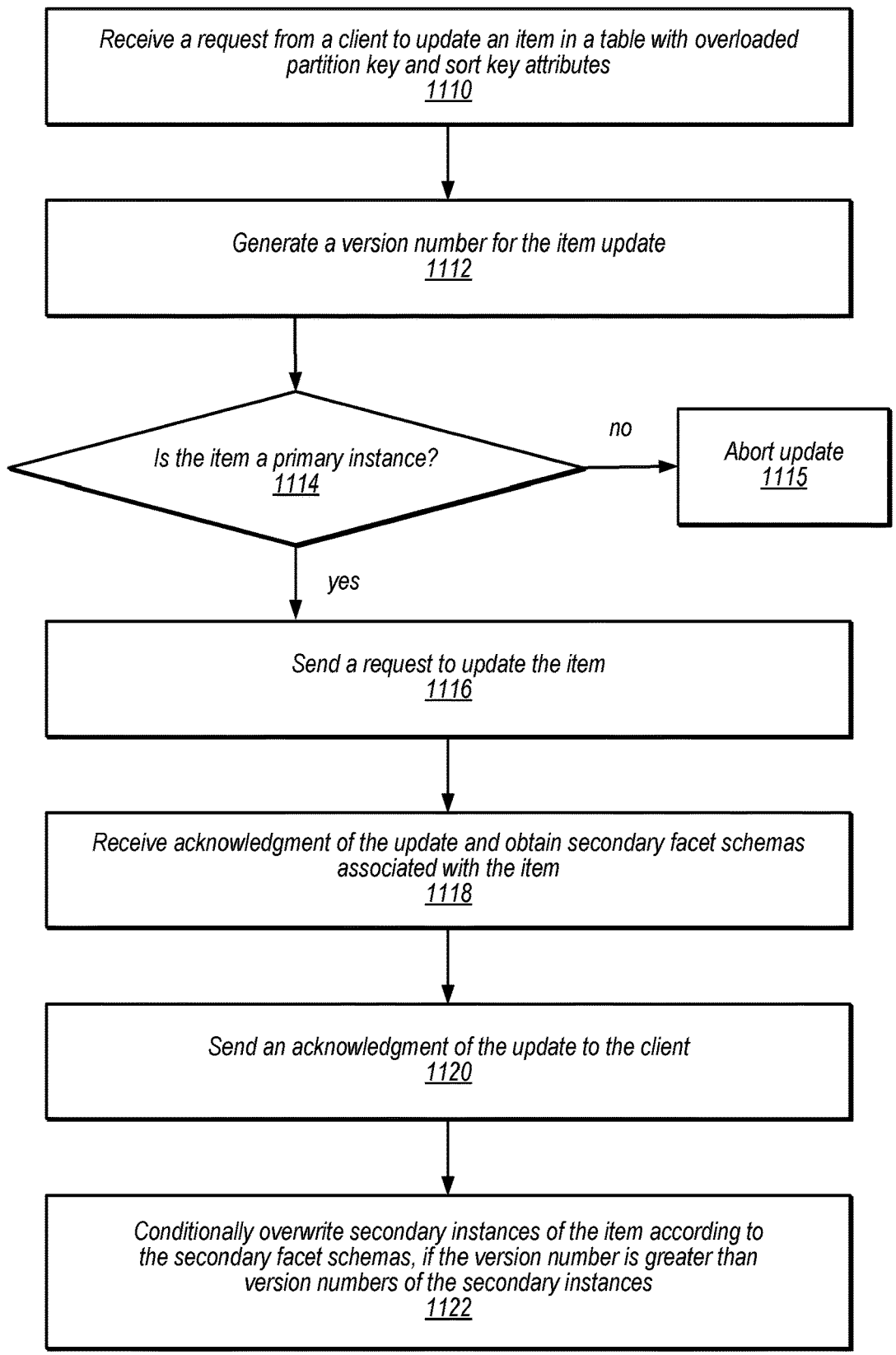
FIGS. 11A and 11B are flow diagrams illustrating different aspects of performing an update operation in a data store that implements key overloading in storage objects, according to some embodiments.
Figure 11B:
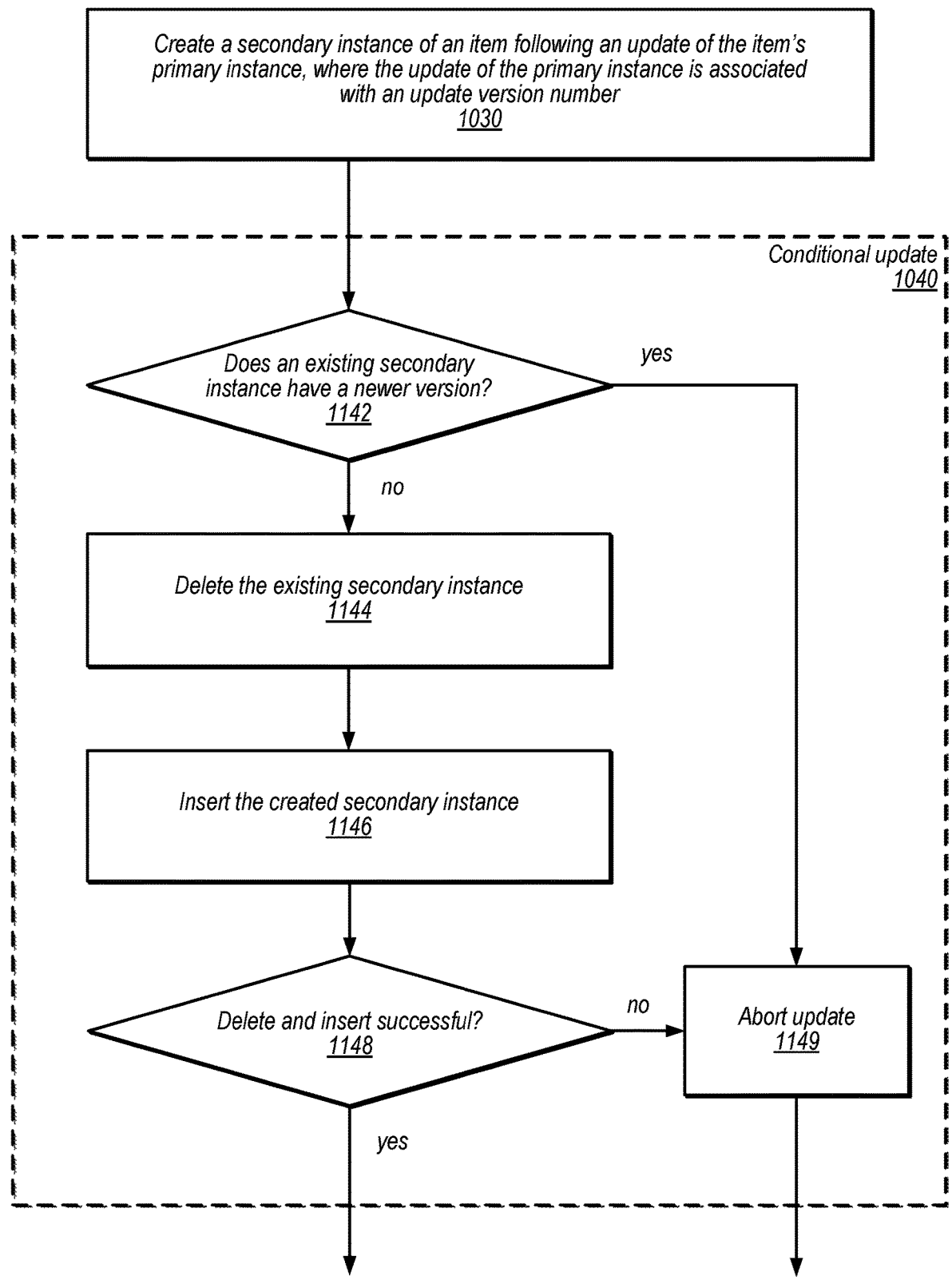

FIGS. 11A and 11B are flow diagrams illustrating different aspects of performing an update operation in a data store that implements key overloading in storage objects, according to some embodiments. The operations of FIGS. 11A and 11B may be performed, for example, by the request router 142 or the storage nodes 150, as discussed in connection with FIG. 1.

The process of FIG. 11A illustrates an update operation on a key overloaded table. The process begins at operation 1110, where a request is received from a client to update an item in a table with overloaded partition key and sort key attributes. In some embodiments, the request may be received via an API of the data store. The table may be key overloaded, for example, storing multiple instances of items that use different attribute values for their partition or sort keys, as described previously.

At operation 1112, a version number is generated for the item update. In some embodiments, the version number may be generated based on a receive timestamp of the update request. In some embodiments, the version number may be generated from one or more values specified in the request, such as a request sequence number. In some embodiments, the version number may be generated by incrementing an existing version number stored with the item. This version number is later used to perform a version check during the propagation phase of the update.

At operation 1114, a determination is made whether the item being updated is a primary instance of the item. In some embodiments, if the item is not a primary instance, the update process is aborted, at operation 1115. For example, in some embodiments, secondary instance of an item cannot be directly updated via a client request. In other embodiments, the check may be skipped, because secondary instances of an item can be directly updated by client requests under certain circumstances. In some embodiments, the determination of operation 1114 may be made by checking whether the item specified in the request is stored with facet schema metadata, which specifies the different facets associated with the item. In some embodiments, the presence of this metadata indicates that the item is the primary instance. In some embodiments, the determination may be made by consulting other metadata. For example, in some embodiments, this property of the instance may be stored as a metadata attribute of the item, or as table-level metadata. If the item is determined to be a primary instance, the process proceeds to operation 1116.

At operation 1116, a request to update the item is sent. In some embodiments, the request may be sent by a request router of the data store to a storage node of the data store. In some embodiments, the request may be sent directly to a storage device. In some embodiments, the request router may select a storage node or a group of storage nodes to handle the request based on the partition key value of item specified by the request. In some embodiments, operations 1114 and 1116 may be performed together as a conditional update, such that operation 1116 will be performed only if the check in operation 1114 simultaneously evaluates to true.

At operation 1118, an acknowledgment of the update is received, and second facet schema associated with the item is obtained. In some embodiments, the acknowledgment may be received by the request router, from the storage node or storage node group handling the update request. In some embodiments, in the acknowledgement, the storage node(s) may also return the before and after state of the item that was updated. Thus, in some embodiments, the request router may receive the secondary facet schemas stored with the primary instance as a result of the update. In some embodiments, the secondary facet schemas may be obtained in another manner, for example, via a lookup of another data table or from table metadata for the table.

At operation 1120, an acknowledgment to the update is sent to the client. In some embodiments, this acknowledgment may be sent by the request router. In some embodiments, the acknowledgment may be sent immediately after the acknowledgement of operation 1118 is received. In some embodiments, the acknowledgment may be formatted in accordance with an API provided by the data store. In some embodiments, the acknowledgement may be sent prior to or without waiting for the secondary instances of the item to be updated. In this manner, the update request can return to the client more quickly.

At operation 1122, the secondary instances of the item are conditionally overwritten according to the secondary facet schemas, which was obtained at operation 1118. In some embodiments, the overwrite is only performed when the version number generated in operation 1112 is greater or newer than the respective version numbers of the secondary instances, which may be stored with the secondary instances. If the condition is not met, this may mean that a later change has already propagated to a secondary instance of the item, and the current update request is an out-of-order update. In some embodiments, the overwrite operation 1122 may be performed asynchronously from the update request itself. In some embodiments, the overwrite operations may be performed at a time selected by the data store and after the acknowledgement of operation 1120.

The process of FIG. 11B depicts certain additional details of the conditional update process, shown as the conditional update 1140. In some embodiments, the conditional update 1140 may be performed as operation 1122 of FIG. 11A. As shown, the process begins at operation 1030, where a secondary instance of the item is created. The creation of the secondary instance follows the updating of the item's primary instance, as discussed in connection with FIG. 11A.

In this example, as shown, the remainder of the operations may be performed as a conditional update 1040. In some embodiments, the conditional update may be performed as an atomic or indivisible operation, so that either all of the operations shown take effect in the data store, or none.

At operation 1142, a determination is made whether an existing secondary instance of the item has a newer version than the version generated with the update of the primary instance. As discussed, if the secondary instance has a greater or equal version, this may indicate an out-of-order update to the secondary instance. In that case, the entire update to the secondary instance may be aborted at operation 1149.

At operation 1144, the existing secondary instance is deleted. In some embodiments, the delete may involve the request router sending a delete request to the storage node(s) managing the secondary instance. At operation 1146, the secondary instance created at operation 1030 is inserted into the table. Together, operations 1144 and 1146 implements an overwrite of the secondary instance. In some embodiments, the overwrite operation may be simpler and less costly than a single update operation. In other embodiments, an update operation on the secondary instance may be used instead.

At operation 1148, a determination is made whether the delete and the insert of the secondary instance is successful. If either was not successful, the entire conditional update may be aborted at operation 1149. If both were successful, the conditional update is completed. Thus, in some embodiments, the conditional update operation will not leave the table in an inconsistent state. In some embodiments, as the updates are propagated to the secondary instances of the item in this fashion, the client may be notified of successful or unsuccessful updates to the secondary instances.

Figure 12:
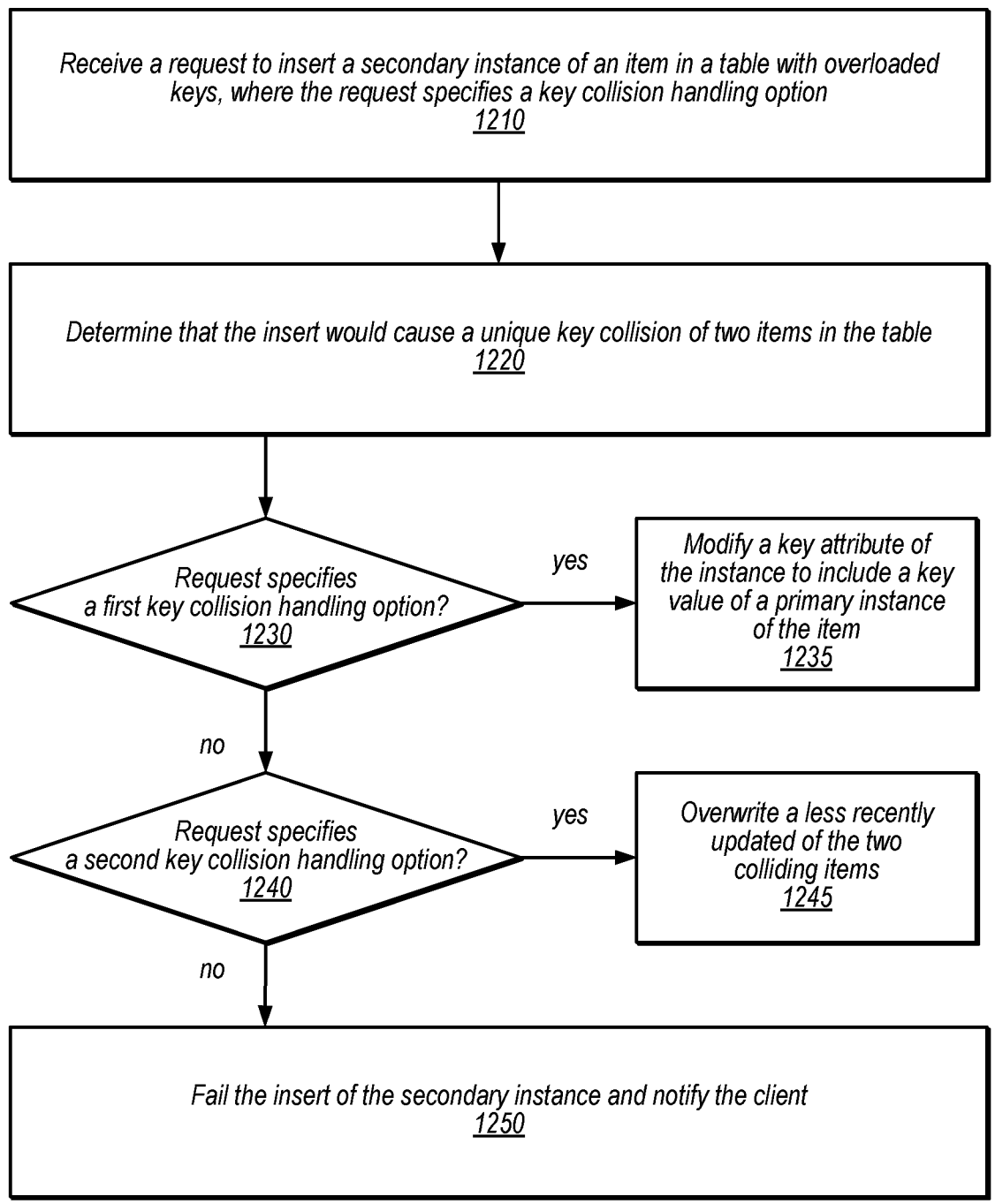
FIG. 12 is a flow diagram illustrating a process of handling a key collision in a table that supports key overloading, according to some embodiments.

FIG. 12 is a flow diagram illustrating a process of handling a key collision in a table that supports key overloading, according to some embodiments. As discussed, in some embodiments, the key attributes of a table may be used as a unique key combination for items in the table. In some embodiments, when the key attributes of a table are overloaded, the items may occasionally cause key collisions, which may be presented as an error during item inserts or updates. Accordingly, in some embodiments, different key collision techniques may be used to automatically resolve this issue. In some embodiments, different key collision techniques may be specified by policy, on a data store a whole, on a table, on particular sets of items, on particular clients, or via the update or insert request itself, as shown in the depicted process.

As operation 1210, a request is received to insert a secondary instance of an item is received. The item is to be inserted into a table with overloaded keys, so that a single item may be stored as multiple secondary instances with different keys, as discussed. In this example, the request itself specifies a key collision handling option. One example of a key collision handling option is seen, for example, in FIG. 2B.

At operation 1220, a determination is made that the insert would cause a unique key collision of two items in the table. In some embodiments, this determination may be made by attempting the insertion, and then receiving an error from the table. In some embodiments, the determination may be made at a storage node that performs the insert. The remaining operation in the process may be performed automatically by the storage node, or by the request router that works with the storage node.

At operation 1230, a determination is made that the request specifies a first key collision handling option. As discussed, in some embodiments, these options may be specified in the request. For example, in FIG. 2B, the option is specified as part of the secondary facet schema. In this option, as shown in operation 1235, a key attribute of the incoming secondary instance is modified to include a key value of a primary instance of the item. Operation 1235 may be performed according to FIG. 5, as one example. In some embodiments, the key values of the primary instance may be required to be a unique key combination, and thus, by concatenating or including the key values of the primary instance, the key values of the secondary instance is also made unique. In other embodiments, other manners of obtaining unique key values may be used. For example, in some embodiments, the key values of the incoming secondary instance may be transformed to include a random value or a counter value.

At operation 1240, a determination is made the request specifies second key collision handling option. In this option, as shown in operation 1245, a less recently updated one of the two colliding items is overwritten. In some embodiments, depending on how the overloaded key fields in the table are used, such behavior may be the desired behavior.

At operation 1250, a third option for handling key collisions is shown. In this example, this last option may be the default option used when the request does not specify any options. In this option, the insert of the secondary instance is simply failed, and a notification is provided to the client that a unique key collision has occurred. In this manner, the client may make a better decision on how to properly fix the collision problem, for example, by adjusting the key values of the items in the table. In some embodiments, no matter which option is taken, the client is notified of any key collisions occurring within the table.

Figure 13:
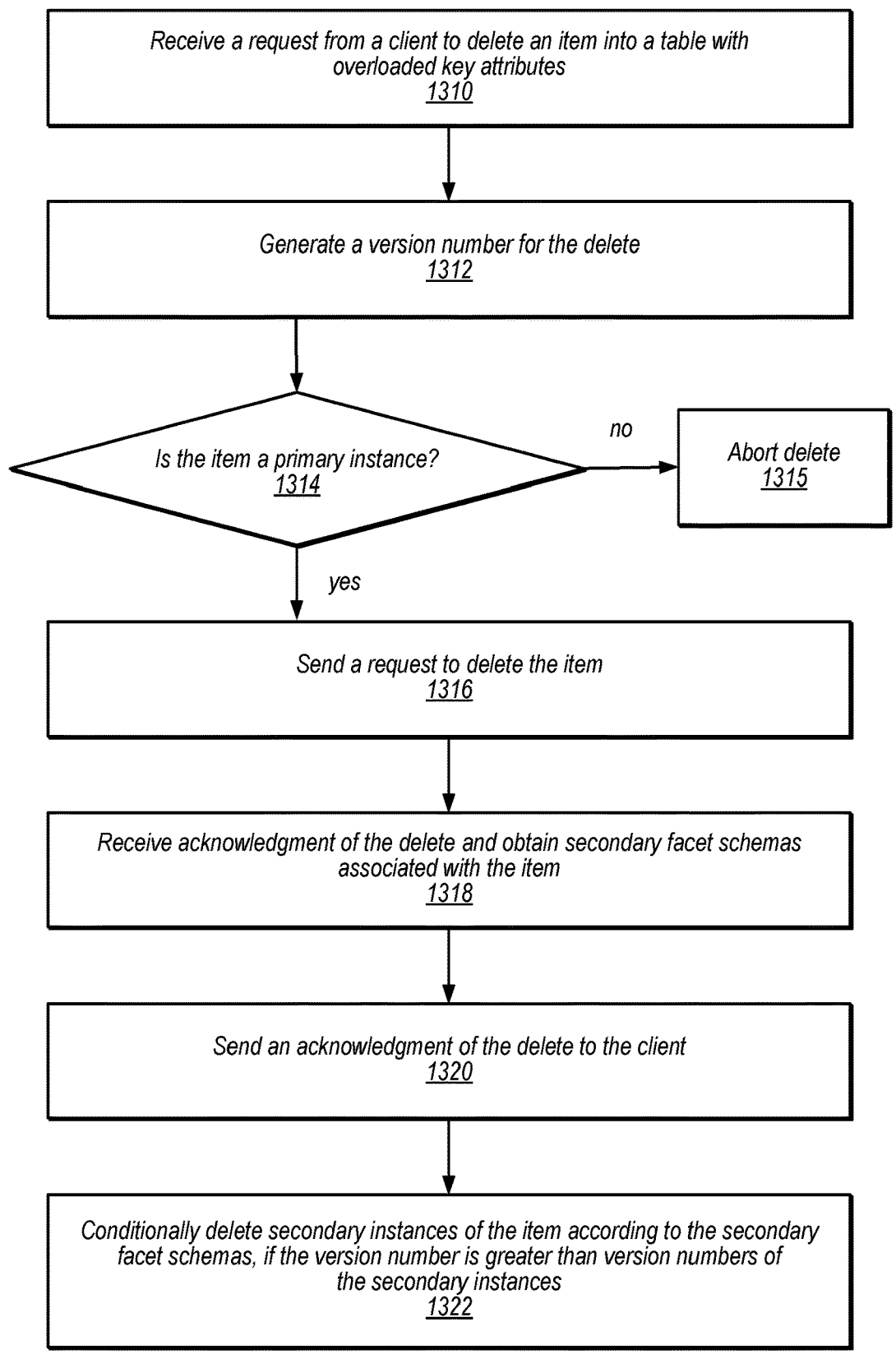
FIG. 13 is a flow diagram illustrating the process of performing a delete operation in a data store that implements key overloading in storage objects, according to some embodiments.

FIG. 13 is a flow diagram illustrating the process of performing a delete operation in a data store that implements key overloading in storage objects, according to some embodiments. The operations of FIG. 13 may be performed, for example, by the request router 142 or the storage nodes 150, as discussed in connection with FIG. 1.

The process begins at operation 1310, where a request is received from a client to delete an item in a table with overloaded key attributes. In some embodiments, the request may be received via an API of the data store. The table may be key overloaded, for example, storing multiple instances of items that use different attribute values for their keys, as described previously.

At operation 1312, a version number is generated for the item update. In some embodiments, the version number may be generated based on a receive timestamp of the delete request. In some embodiments, the version number may be generated from one or more values specified in the request, such as a request sequence number. In some embodiments, the version number may be generated by incrementing an existing version number stored with the item. This version number is later used to perform a version check during the propagation phase of the delete.

At operation 1314, a determination is made whether the item being delete is a primary instance of the item. In some embodiments, if the item is not a primary instance, the delete process is aborted, at operation 1315. For example, in some embodiments, secondary instance of an item cannot be directly updated via a client request. In other embodiments, the check may be skipped, because secondary instances of an item can be directly updated by client requests under certain circumstances. In some embodiments, the determination of operation 1314 may be made by checking whether the item specified in the request is stored with facet schema metadata, which specifies the different facets associated with the item. In some embodiments, the presence of this metadata indicates that the item is the primary instance. In some embodiments, the determination may be made by consulting other metadata. For example, in some embodiments, this property of the instance may be stored as a metadata attribute of the item, or as table-level metadata. If the item is determined to be a primary instance, the process proceeds to operation 1316.

At operation 1316, a request to delete the item is sent. In some embodiments, the request may be sent by a request router of the data store to a storage node of the data store. In some embodiments, the request may be sent directly to a storage device. In some embodiments, the request router may select a storage node or a group of storage nodes to handle the request based on the partition key value of item specified by the request. In some embodiments, operations 1314 and 1316 may be performed together as a conditional delete, such that operation 1316 will be performed only if the check in operation 1314 simultaneously evaluates to true.

At operation 1318, an acknowledgment of the delete is received, and second facet schema associated with the item is obtained. In some embodiments, the acknowledgment may be received by the request router, from the storage node or storage node group handling the delete request. In some embodiments, in the acknowledgement, the storage node(s) may also return the state of the item that was delete. Thus, in some embodiments, the request router may receive the secondary facet schemas stored with the primary instance as a result of the delete. In some embodiments, the secondary facet schemas may be obtained in another manner, for example, via a lookup of another data table or from table metadata for the table.

At operation 1320, an acknowledgment to the delete is sent to the client. In some embodiments, this acknowledgment may be sent by the request router. In some embodiments, the acknowledgment may be sent immediately after the acknowledgement of operation 1318 is received. In some embodiments, the acknowledgment may be formatted in accordance with an API provided by the data store. In some embodiments, the acknowledgement may be sent prior to or without waiting for the secondary instances of the item to be deleted. In this manner, the delete request can return to the client more quickly.

At operation 1322, the secondary instances of the item are conditionally deleted according to the secondary facet schemas, which was obtained at operation 1318. In some embodiments, the delete is only performed when the version number generated in operation 1312 is greater or newer than the respective version numbers of the secondary instances, which may be stored with the secondary instances. If the condition is not met, this may mean that a later change has already propagated to a secondary instance of the item, and the current delete request is an out-of-order operation. In some embodiments, the delete operation 1322 may be performed asynchronously from the delete request itself. In some embodiments, the delete operations may be performed at a time selected by the data store and after the acknowledgement of operation 1320.

Figure 14:
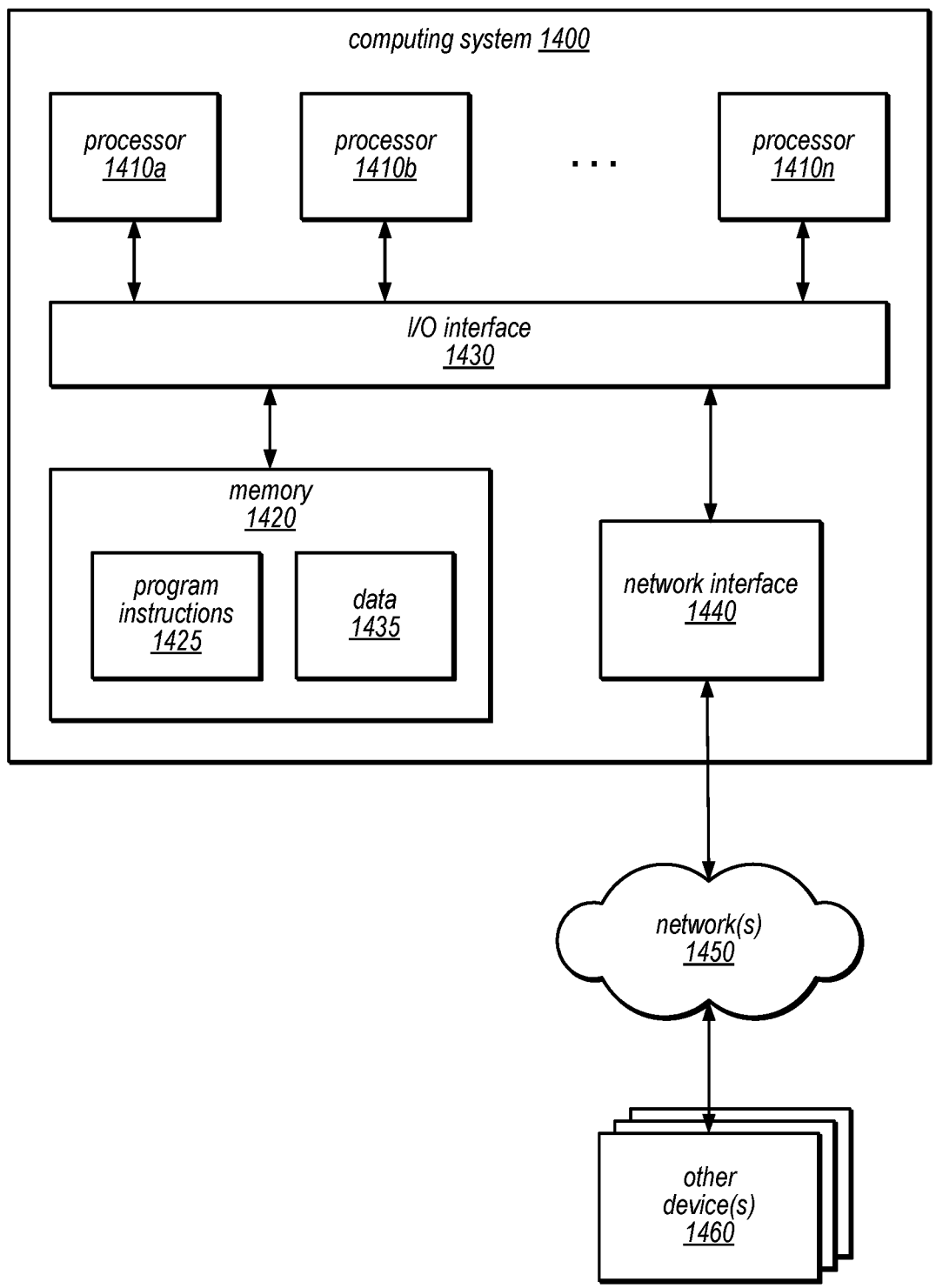
FIG. 14 is a block diagram illustrating an example computer system that can be used to implement one or more portions of a data store that implements key overloading in storage objects, according to some embodiments.

FIG. 14 is a block diagram illustrating an example computer system that can be used to implement one or more portions of a data store that implements key overloading in storage objects, according to some embodiments. Computer system 1400 may include or be configured to access one or more nonvolatile computer-accessible media. In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1420 as code 1425 and data 1435.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 920, may be incorporated directly into processor 1410.

Network interface 1440 may be configured to allow data to be exchanged between computer system 1400 and other devices 1460 attached to a network or networks 1450, such as other computer systems or devices, such as routers and other computing devices, as illustrated in FIGS. 1 through 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more processors and associated memory that implements request router of a data store to, responsive to a request to insert an item comprising a plurality of attributes into a table, wherein respective items stored in the table are identified in the table according to values for a key set unique to respective ones of the items, wherein the key set is formed from one or more specified attributes of the items stored in one or more key fields containing values for the one or more specified attributes for the respective items:
send a request to a first storage node to store a primary instance of the item in the table according to a first key specified for the item, wherein the first key is based on the one or more specified attributes for the key set such that a value for one of the one or more specified attributes for the item is stored in a first key field for the key set that uniquely identifies the item in the table; and
send another request to a second storage node to store a second instance of the item in the table according to a second key specified for the item, wherein the second key is based on at least one other attribute of the plurality of attributes of the item not used for the first key, wherein a value for the other attribute of the item is stored in the first key field for the key set as an overloaded key field; and
one or more processors and associated memory that implements a plurality of storage nodes of the data store, including the first and the second storage nodes, to:
store the primary instance of the item and the second instance of the item in the same table for querying by different attributes without using a secondary index.

2. The system of claim 1, wherein:
the first key comprises a first partition key and a first sort key specified in a primary facet schema, wherein the primary instance is stored in a first partition of the table determined according to the first partition key and in sorted order according to the first sort key; and
the second key comprises a second partition key and a second sort key specified in a secondary facet schema, wherein the second instance is stored in a second partition of the table determined according to the second partition key and in sorted order according to the second sort key.

3. The system of claim 2, wherein the request router is to:
generate the second instance of the item using the second partition key and the second sort key as the second instance's key values; and
select the other storage node to store the second instance based at least in part on the second partition key.

4. The system of claim 1, wherein the request router is to:
responsive to an update request to update the item:
send a request to the first storage node to update the primary instance of the item according to the update request;
determine the second key used to store the second instance; and
send one or more requests to the second storage node to overwrite the second instance using the second key and according to the update request.

5. The system of claim 4, wherein:
the request router is to generate a version associated with the update request; and
the overwrite is performed conditionally based at least in part on a determination that a current version of the second instance is older than the version of the update request.

6. A method, comprising:
performing, by one or more computing devices comprising one or more respective processors and memory implementing one or more databases:
responsive to a request to insert an item comprising a plurality of attributes into a table of one of the databases, wherein respective items stored in the table are identified in the table according to values for a key set unique to respective ones of the items, wherein the key set is formed from one or more specified attributes of the items stored in one or more key fields containing values for the one or more specified attributes for the respective items:
storing a primary instance of the item in the table according to a first key specified for the item, wherein the first key is based on the one or more specified attributes for the key set such that a value for one of the one or more specified attributes for the item is stored in a first key field for the key set that uniquely identifies the item in the table; and
storing a second instance of the item in the table according to a second key specified for the item, wherein the second key is based on at least one other attribute of the plurality of attributes of the item not used for the first key, wherein a value for the other attribute of the item is stored in the first key field for the key set as an overloaded key field;
wherein the primary instance of the item and the second instance of the item are stored in the same table for querying by different attributes without using a secondary index;
responsive to a first query of the table that specifies the first key, retrieving the primary instance of the item using the first key; and
responsive to a second query of the table that specifies the second key, retrieving the second instance of the item using the second key.

7. The method of claim 6, wherein the second key is specified in secondary facet schema included in the request to insert the item, and further comprising:
receiving another request to insert another item into the table, the other request including a different secondary facet schema; and
storing an instance of the other item in the table according to the different secondary facet schema.

8. The method of claim 6, further comprising:
prior to the request to insert the item:
receiving a creation request to create the table, wherein the creation request includes a primary facet schema specifying the first key and a secondary facet schema specifying the second key;
creating the table according to the creation request; and
storing the primary facet schema and the secondary facet schema as part of table metadata of the table.

9. The method of claim 6, wherein:
the first key comprises a first partition key and a first sort key specified in a primary facet schema, wherein the primary instance is stored in a first partition of the table determined according to the first partition key and in sorted order according to the first sort key; and
the second key comprises a second partition key and a second sort key specified in a secondary facet schema, wherein the second instance is stored in a second partition of the table determined according to the second partition key and in sorted order according to the second sort key.

10. The method of claim 9, wherein:
the request is received by a request router of a data store, and the storing of the second instance of the item comprises performing, by the request router:
generating the second instance of the item using the second partition key and the second sort key as the second instance's key values;
selecting a storage node of the data store to store the second instance based at least in part on the second partition key; and
sending a request to the storage node to store the second instance.

11. The method of claim 9, wherein:
the secondary facet schema specifies a subset of the attributes of the item as projected attributes, wherein unprojected attributes of the item are not returned in response to subsequent queries to the table.

12. The method of claim 9, further comprising:
returning a result set for another query to the table, wherein the result set contain items that are stored under different facet schemas of the table.

13. The method of claim 9, further comprising:
determining that the secondary facet schema is defined as an isolated facet schema of the table; and
storing the second instance comprises incorporating a token into the second partition key, wherein the token causes items stored under the secondary facet schema to be assigned to a set of partitions that are isolated from partitions used by other facet schemas of the table.

14. The method of claim 6, further comprising:
responsive to an update request to update the item:
updating the primary instance of the item according to the update request;
determining the second key used to store the second instance; and
overwriting the second instance using the second key and according to the update request.

15. The method of claim 14, wherein:
the second key is specified in a facet schema stored with the primary instance of the item; and
determining the second key comprises obtaining the facet schema stored with the primary instance.

16. The method of claim 15, further comprising:
receiving another update request to update another item;
determining that the other item is not stored with facet metadata for other instances of the other item; and
aborting the other update without updating the other item.

17. The method of claim 14, wherein:
the update request is received by a request router of a data store;
updating the primary instance comprises performing, by the request router:
sending the update request to a storage node of the data store storing the primary instance;
receiving an acknowledgement for the update request from the storage node; and
sending a response to a client that issued the update request; and
the overwriting of the second instance is performed by another storage of the data store after the sending of the response to the client.

18. The method of claim 14, wherein:
updating the primary instance comprises generating a version associated with the update request; and
the overwriting of the second instance is performed conditionally based at least in part on a determination that a current version of the second instance is older than the version of the update request.

19. The method of claim 14, further comprising:
determining that the update request would cause a unique key collision of two items in the table;
performing a key collision handling operation specified in update request, wherein key collision handling operation comprises one of:
modifying a key attribute of the second instance to include a key value of the primary instance;
overwriting a less recently updated item of the two items with a more recently updated item of the two items; or
failing the update request with respect to the second instance and notifying the client of the failure.

20. A non-transitory computer-accessible storage medium storing program instructions that when executed on one or more processors of a computer, cause the computer to:
responsive to a request to insert an item comprising a plurality of attributes into a table in a data store, wherein respective items stored in the table are identified in the table according to values for a key set unique to respective ones of the items, wherein the key set is formed from one or more specified attributes of the items stored in one or more key fields containing values for the one or more specified attributes for the respective items:
send a request to a storage node to store a primary instance of the item in the table according to a first key specified for the item, wherein the first key is based on the one or more specified attributes for the key set such that a value for one of the one or more specified attributes for the item is stored in a first key field for the key set that uniquely identifies the item in the table; and
send another request to another storage node to store a second instance of the item in the table according to a second key specified for the item, wherein the second key is based on at least one other attribute of the plurality of attributes of the item not used for the first key, wherein a value for the other attribute of the item is stored in the first key field for the key set as an overloaded key field;

wherein the primary instance of the item and the second instance of the item are stored in the same table for querying by different attributes without using a secondary index.

21. The non-transitory computer-accessible storage medium of claim 20, wherein:
- the first key comprises a first partition key and a first sort key specified in a primary facet schema, wherein the primary instance is stored in a first partition of the table determined according to the first partition key and in sorted order according to the first sort key; and
- the second key comprises a second partition key and a second sort key specified in a secondary facet schema, wherein the second instance is stored in a second partition of the table determined according to the second partition key and in sorted order according to the second sort key.

22. The non-transitory computer-accessible storage medium of claim 21, wherein the program instructions when executed on the one or more processors cause the computer to:
- generate the second instance of the item using the second partition key and the second sort key as the second instance's key values; and
- select the other storage node to store the second instance based at least in part on the second partition key.

23. The non-transitory computer-accessible storage medium of claim 20, wherein the program instructions when executed on the one or more processors cause the computer to:
- responsive to an update request to update the item:
  - send a request to the first storage node to update the primary instance of the item according to the update request;
  - determine the second key used to store the second instance; and
  - send one or more requests to the second storage node to overwrite the second instance using the second key and according to the update request.

24. The non-transitory computer-accessible storage medium of claim 23, wherein the program instructions when executed on the one or more processors cause the computer to:
- generate a version associated with the update request; and
- send the one or more requests to the second storage node to perform the overwrite conditionally based at least in part on a determination that a current version of the second instance is older than the version of the update request.

25. The non-transitory computer-accessible storage medium of claim 21, wherein the program instructions when executed on the one or more processors cause the computer to:
- determine that the secondary facet schema is defined to be an isolated facet schema of the table; and
- incorporate a token into the second partition key, wherein the token causes items stored under the secondary facet schema to be assigned to a set of partitions that are isolated from partitions used by other facet schemas of the table.

* * * * *